US012574920B2

(12) United States Patent
Wang et al.

(10) Patent No.:  US 12,574,920 B2
(45) Date of Patent:      Mar. 10, 2026

(54) SIDELINK SL-BASED POSITIONING METHOD AND APPARATUS, AND TERMINAL

(71) Applicant: VIVO MOBILE COMMUNICATION CO., LTD., Dongguan (CN)

(72) Inventors: Yuanyuan Wang, Dongguan (CN); Shuyan Peng, Dongguan (CN); Ye Si, Dongguan (CN); Huaming Wu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 299 days.

(21) Appl. No.: 18/205,110

(22) Filed: Jun. 2, 2023

(65) Prior Publication Data

US 2023/0328716 A1     Oct. 12, 2023

Related U.S. Application Data

(63) Continuation of application No. PCT/CN2021/135471, filed on Dec. 3, 2021.

(30) Foreign Application Priority Data

Dec. 4, 2020     (CN) .......................... 202011403558.6

(51) Int. Cl.
*H04W 72/1263*         (2023.01)
*H04W 72/232*          (2023.01)
(Continued)

(52) U.S. Cl.
CPC ..... *H04W 72/1263* (2013.01); *H04W 72/232* (2023.01); *H04W 72/25* (2023.01); *H04W 72/40* (2023.01)

(58) Field of Classification Search
CPC ........... H04W 72/1263; H04W 72/232; H04W 72/25; H04W 72/40; H04W 4/029;
(Continued)

(56) References Cited

U.S. PATENT DOCUMENTS 9,713,117 B2      7/2017  Khoryaev et al.
11,006,247 B2     5/2021  Chae et al.
(Continued)

FOREIGN PATENT DOCUMENTS

CN          106662634 A      5/2017
CN          110536234 A      12/2019
(Continued)

OTHER PUBLICATIONS

Huawei et al., "Sidelink physical layer structure for NR V2X", 3GPPTSG RAN WGI Meeting #99, Nov. 18-22, 2019, Reno, US, R1-1911882.
(Continued)

*Primary Examiner* — Diane D Mizrahi
(74) *Attorney, Agent, or Firm* — The Webb Law Firm

(57)                    ABSTRACT

A sidelink SL-based positioning method, an apparatus, and a terminal are disclosed. The method includes: a first terminal sends an SL reference signal; where the SL reference signal is used for at least one of the following: determining a location of the first terminal; determining a relative location between the first terminal and at least one second terminal; determining a location of at least one of second terminal; or determining a distance between the first terminal and at least one of second terminal.

18 Claims, 15 Drawing Sheets

(51) Int. Cl.
*H04W 72/25* (2023.01)
*H04W 72/40* (2023.01)

(58) Field of Classification Search
CPC ....... H04W 4/023; H04W 92/18; H04W 4/40;
H04W 64/00; H04W 4/02; H04W 64/006;
G01S 2205/01; G01S 5/0072; G01S
5/0205; H04L 5/0048
See application file for complete search history.

(56) References Cited

U.S. PATENT DOCUMENTS

| | | | |
|---|---|---|---|
| 11,317,415 B2 | 4/2022 | Khoryaev et al. | |
| 11,470,582 B2 | 10/2022 | Tang et al. | |
| 2019/0230618 A1 | 7/2019 | Saur et al. | |
| 2020/0305174 A1 | 9/2020 | Ganesan et al. | |
| 2020/0359367 A1 | 11/2020 | Tang et al. | |
| 2021/0112375 A1 | 4/2021 | Lee et al. | |
| 2021/0219292 A1 | 7/2021 | Wang et al. | |
| 2021/0331701 A1* | 10/2021 | Hur ........................ | H04W 4/44 |
| 2022/0007354 A1 | 1/2022 | Si et al. | |
| 2022/0279310 A1 | 9/2022 | Xiao et al. | |

FOREIGN PATENT DOCUMENTS

| | | | |
|---|---|---|---|
| CN | 110839209 A | 2/2020 | |
| CN | 110912658 A | 3/2020 | |
| CN | 111213393 A | 5/2020 | |
| CN | 111246373 A | 6/2020 | |
| CN | 111277385 A | 6/2020 | |
| CN | 111295914 A | 6/2020 | |
| CN | 111448807 A | 7/2020 | |
| CN | 111656835 A | 9/2020 | |
| JP | 2007192685 A | 8/2007 | |
| WO | 2020063519 A1 | 4/2020 | |
| WO | 2020064214 A1 | 4/2020 | |
| WO | 2020067343 A1 | 4/2020 | |
| WO | 2020192547 A1 | 10/2020 | |
| WO | 2020231303 A1 | 11/2020 | |

OTHER PUBLICATIONS

Mitsubishi Electric, "Physical layer design for NR V2X sidelink",
3GPP TSG RAN WG1 #97, May 13-17, 2019, Reno, US, R1-1907024.

* cited by examiner

200

S210

Send an SL reference signal

300

S310

Send an SL reference signal based on first content

SRS

Comb-4, 8 symbols

SRS

Comb-4, 12 symbols

Comb-2, 6 symbols

Comb-2, 4 symbols comb-8 comb-8

Comb-6, RE shift=3, L=2, lowest RE=0

Comb-6, RE shift=3, L=6, lowest RE=0

Comb-4, RE shift=1, L=4, lowest RE=0

Comb-4, RE shift=1, L=8, lowest RE=0

Comb-1, L=1, lowest RE=0      $t$

Comb-12, RE shift=1, L=12, lowest RE=0     $t$

Comb-12, RE shift=1, L=6, lowest RE=0

700

S710

Send an SL reference signal

First terminal

Second terminal

900

S910

Receive an SL reference signal sent by a first terminal

S920

Perform a predetermined operation based on the SL reference signal

SIDELINK SL-BASED POSITIONING METHOD AND APPARATUS, AND TERMINAL

CROSS-REFERENCE TO RELATED APPLICATIONS

This application is a Bypass Continuation Application of International Patent Application No. PCT/CN2021/135471 filed Dec. 3, 2021, and claims priority to Chinese Patent Application No. 202011403558.6 filed Dec. 4, 2020, the disclosures of which are hereby incorporated by reference in their entireties.

BACKGROUND OF THE INVENTION

Field of the Invention

This application pertains to the field of wireless communication technologies, and specifically relates to a sidelink SL-based positioning method and apparatus, and a terminal.

Description of Related Art

All communication systems such as a 5th generation new radio (5G NR) system and a long term evolution (LTE) system can support sidelink (SL) transmission. To be specific, data transmission between user equipments (UE, which is terminal) can be performed directly on the physical layer without passing through a network device.

However, for scenarios with SL transmission such as vehicle to everything (V2X) or Industrial Internet of Things (IIOT), the related SL technology can satisfy basic safety-type V2X communication, but cannot adapt to other more advanced V2X services, such as positioning services.

SUMMARY OF THE INVENTION

According to a first aspect, a sidelink SL-based positioning method is provided, performed by a first terminal. The method includes: sending an SL reference signal; where the SL reference signal is used for at least one of the following: determining a location of the first terminal; determining a relative location between the first terminal and at least one second terminal; determining a location of at least one of second terminal; or determining a distance between the first terminal and at least one of second terminal.

According to a second aspect, a sidelink SL-based positioning method is provided, performed by a second terminal. The method includes: receiving an SL reference signal sent by a first terminal; and performing at least one of the following based on the SL reference signal: determining a location of the first terminal; determining a relative location between the first terminal and the second terminal; determining a location of the second terminal; or determining a distance between the first terminal and the second terminal.

According to a third aspect, a sidelink SL-based positioning apparatus is provided. The apparatus includes: a sending module, configured to send an SL reference signal; where the SL reference signal is used for at least one of the following: determining a location of a first terminal; determining a relative location between the first terminal and at least one second terminal; determining a location of at least one of second terminal; or determining a distance between the first terminal and at least one of second terminal.

According to a fourth aspect, a sidelink SL-based positioning apparatus is provided. The apparatus includes: a receiving module, configured to receive an SL reference signal sent by a first terminal; and a measurement module, configured to perform at least one of the following based on the SL reference signal: determining a location of the first terminal; determining a relative location between the first terminal and a second terminal; determining a location of the second terminal; or determining a distance between the first terminal and the second terminal.

According to a fifth aspect, a terminal is provided, where the terminal includes a processor, a memory, and a program or instructions stored in the memory and executable on the processor, and when the program or the instructions are executed by the processor, the steps of the method according to the first aspect are implemented, or the steps of the method according to the second aspect are implemented.

According to a sixth aspect, a network-side device is provided, where the network-side device includes a processor, a memory, and a program or instructions stored in the memory and executable on the processor, and when the program or the instructions are executed by the processor, the steps of the method according to the first aspect are implemented, or the steps of the method according to the second aspect are implemented.

According to a seventh aspect, a non-transitory readable storage medium is provided, where a program or instructions are stored in the non-transitory readable storage medium, and when the program or the instructions are executed by a processor, the steps of the method according to the first aspect are implemented, or the steps of the method according to the second aspect are implemented.

According to an eighth aspect, a chip is provided, where the chip includes a processor and a communications interface, the communications interface is coupled to the processor, and the processor is configured to run a program or instructions of a network-side device to implement the method according to the first aspect or implement the method according to the second aspect.

According to a ninth aspect, a computer program product is provided, where the computer program product includes a processor, a memory, and a program or instructions stored in the memory and executable on the processor, and when the program or the instructions are executed by the processor, the steps of the method according to the first aspect or the steps of the method according to the second aspect is implemented.

DESCRIPTION OF THE INVENTION

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

In the specification and claims of this application, the terms such as "first" and "second" are intended to distinguish between similar objects but do not necessarily indicate a specific order or sequence. It should be understood that the data used in this way is interchangeable in appropriate circumstances so that the embodiments of this application can be implemented in other orders than the order illustrated or described herein, and "first" and "second" are usually for distinguishing same-type objects but not limiting the number of objects, for example, a first object may be one or multiple. In addition, "and/or" in this specification and claims indicates at least one of connected objects, and the character "/" generally indicates that the associated objects are in an "or" relationship.

It should be noted that techniques described in the embodiments of this application are not limited to a long term evolution (LTE) or LTE-Advanced (LTE-A) system, and may also be applied to various wireless communication systems, for example, code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. Techniques described herein may be used in the aforementioned systems and radio technologies, and may also be used in other systems and radio technologies. However, in the following descriptions, a new radio (New Radio, NR) system is described for an illustration purpose, and NR terms are used in most of the following descriptions, although these technologies may also be applied to other applications than an NR system application, for example, the 6th generation (6G) communication system.

Figure 1:
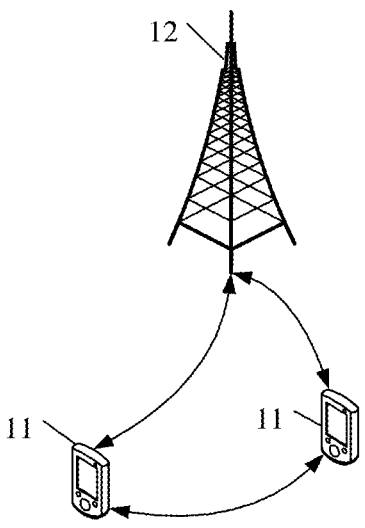
FIG. 1 is a schematic diagram of a wireless communication system according to an example embodiment of this application.

FIG. 1 is a block diagram of a wireless communication system to which the embodiments of this application are applicable. The wireless communication system includes a terminal 11 and a network-side device 12. The terminal 11 may also be referred to as a terminal device or a user terminal, and the terminal 11 may be a terminal-side device, such as a mobile phone, a tablet computer, a laptop computer or a notebook computer, a personal digital assistant (PDA), a palmtop computer, a netbook, an ultra-mobile personal computer (UMPC), a mobile Internet device (MID), a wearable device, vehicle, street light, vehicle user equipment (VUE), or pedestrian user equipment (PUE). The wearable device includes: a wrist band, earphones, glasses, or the like. It should be noted that a specific type of the terminal 11 is not limited in the embodiments of this application. The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmission and reception point (TRP), or another appropriate term in the art. Provided that a same technical effect is achieved, the base station is not limited to a specific technical term. It should be noted that in the embodiments of this application, the base station in the NR system is merely used as an example, and a specific type of the base station is not limited.

The following describes in detail the technical solution provided in the embodiments of this application by using some embodiments and application scenarios thereof with reference to the accompanying drawings.

Figure 2:
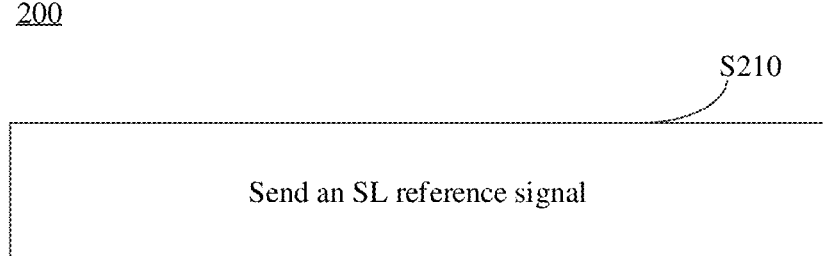
FIG. 2 is a schematic flowchart of an SL-based positioning method according to an example embodiment of this application.

As shown in FIG. 2, FIG. 2 is a schematic flowchart of an SL-based positioning method 200 according to an example embodiment of this application. The method 200 may be performed by a first terminal, for example, by software and/or hardware installed on the first terminal. The method may include the following steps.

S210. Send an SL reference signal.

The SL reference signal may be used to implement terminal positioning in V2X scenarios, such as relative positioning or absolute positioning between terminals. In this embodiment, the SL reference signal may be used for at least one of the following (1) to (4):

(1) determining a location of the first terminal;

(2) determining a relative location between the first terminal and at least one second terminal;

(3) determining a location of at least one of second terminal; or (4) determining a distance between the first terminal and at least one of second terminal.

The foregoing (1) to (4) may be determined based on the SL reference signal by the first terminal sending the SL reference signal, or determined based on the SL reference signal by a second terminal receiving or scheduling the SL reference signal, which is not limited herein. In addition, when the first terminal sends the SL reference signal, the first terminal may send the SL reference signal in a unicast, groupcast, or broadcast manner, depending on a positioning requirement or positioning scenario under V2X.

It should be noted that depending on a positioning requirement or positioning scenario under V2X, the first terminal may act as a transmit terminal for sending the SL reference signal, or as a receive terminal for receiving an SL reference signal sent by other terminals, or as a scheduling terminal for scheduling other terminals to send or receive the SL reference signal. In other words, depending on a positioning requirement or positioning scenario under V2X or IIOT, the first terminal may act as a different role for implementing a positioning service. The second terminal is similar to the first terminal, which is not repeated herein.

In this embodiment, the first terminal sends an SL reference signal, where the SL reference signal is used for at least one of the following: determining a location of the first terminal; determining a relative location between the first terminal and at least one of second terminal; determining a location of at least one of second terminal; or determining a distance between the first terminal and at least one of second terminal, so as to implement SL-based terminal positioning, adapting to terminal positioning service requirements in V2X or IIOT scenarios.

Figure 3:
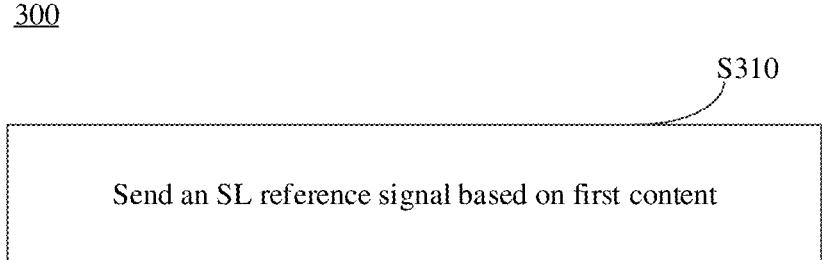
FIG. 3 is a schematic flowchart of an SL-based positioning method according to an example embodiment of this application.

As shown in FIG. 3, FIG. 3 is a schematic flowchart of an SL-based positioning method 300 according to an example embodiment of this application. The method 300 may be performed by a first terminal, for example, by software and/or hardware installed on the first terminal. The method 300 may include the following steps.

S310: Send an SL reference signal based on first content. The first content includes at least one of the following (1) to (5).

(1) First Scheduling Request

The first scheduling request indicates a network-side device (for example, a base station or a core network device) to schedule the SL reference signal, for example, indicating the network-side device to schedule the first terminal to send the SL reference signal.

(2) Second Scheduling Request

The second scheduling request indicates a third terminal to schedule the SL reference signal, for example, indicating the third terminal to schedule the first terminal to send the SL reference signal. The third terminal may be the same as or different from the second terminal, which is not limited herein.

(3) Pre-Configured Requirement

The pre-configured requirement may be a service requirement such as a positioning requirement, a ranging requirement, an anti-collision requirement, or a charging requirement. Alternatively, the pre-configured requirement may be a service requirement, a positioning request command, or the like.

In an implementation, the pre-configured requirement may be configured by the terminal or the network-side device, or specified by a protocol, which is not limited herein.

In another implementation, the pre-configured requirement may trigger sending of an SL signal under specific conditions, for example, automatic driving being started or smart logistics.

(4) Pre-Configured Resource Configuration

Similar to the pre-configured requirement, the pre-configured resource configuration may be configured by the terminal or the network-side device, or specified by the protocol, which is not limited herein.

In an implementation, the resource configuration may include a time domain resource, a frequency domain resource, a space domain resource, and the like involved in transmission of the SL reference signal, which is not limited herein in this embodiment.

In another implementation, the pre-configured resource is a resource reserved in advance.

In yet another implementation, the pre-configured resource is a resource that satisfies transmission of the SL reference signal.

(5) Predetermined Indication

The predetermined indication may be implemented by, but not limited to, sidelink control information (SCI), downlink control information (DCI), or the like, which is not limited herein in this embodiment.

It can be understood that in the foregoing (1) to (5), the implementation process of S310 varies with the first content, for example, when the first content includes the first scheduling request, the sending an SL reference signal based on first content includes: sending the SL reference signal based on the first scheduling request. For another example, in a case that the first content includes the first scheduling request and the pre-configured resource configuration, the sending an SL reference signal based on first content includes: sending the SL reference signal based on the first scheduling request and the pre-configured resource configuration.

It should be noted that for the implementation process for the SL reference signal in S310, reference may be made to the description of S210 described above. In a possible implementation, the SL reference signal satisfies at least one of the following (1) to (5).

(1) A sending position of the SL reference signal exceeds a range of a first SL resource.

The first SL resource may include an SL bandwidth part (BWP), an SL resource pool, an SL transport channel, and the like.

It should be noted that the sending position of the SL reference signal may alternatively have no correspondence with the range of the first SL resource. For example, the SL reference signal may be sent independently of the first SL resource, which is not limited herein.

(2) The sending position of the SL reference signal is indicated by first SCI or first DCI.

The first SCI includes first-stage SCI and/or second-stage SCI.

(3) A sending status of the SL reference signal is indicated by the first SCI or the first DCI.

In the foregoing (2) and (3), the sending position and sending status of the SL reference signal may be statically indicated or dynamically indicated based on indication of the first SCI or the first DCI, which is not limited in this embodiment.

(4) The SL reference signal is a reference signal with a target pattern.

For the target pattern, reference may be made to subsequent description of the pattern characteristic, which is not repeated herein.

(5) A sending status of the SL reference signal is related to first specified information, where the first specified information includes at least one of priority information, resource pool information, channel busy ratio (CBR), channel occupancy ratio (CR), quality of service (QOS) parameter, terminal communication range, transmission type (for example, unicast, groupcast, or broadcast), or terminal type (for example, VUE, PUE, a toll station, a cargo sign, or street lights).

In another implementation, in a case that the first terminal sends the SL reference signal according to the first scheduling request or the second scheduling request, the SL reference signal satisfies at least one of the following (1) to (5).

(1) A scheduling position of the SL reference signal is less than the range of the first SL resource.

The first SL resource may include an SL BWP, an SL resource pool, an SL transport channel, and the like. Assuming that the first SL resource is an SL BWP, the scheduling position of the SL reference signal covers the range of the first SL resource, or the scheduling position of the SL reference signal is less than the range of the first SL resource, which is not limited herein in this embodiment.

It should be noted that the scheduling position of the SL reference signal may alternatively have no correspondence with the range of the first SL resource. For example, the SL reference signal may be scheduled independently of the first SL resource.

(2) The scheduling position of the SL reference signal is indicated by second SCI or second DCI.

For example, the SL reference signal may be scheduled at a fixed position using the N1-th to N2-th symbols in the second SCI or the second DCI. It should be noted that the N1-th to N2-th symbols cannot conflict with the SCI, DMRS, and PSFCH, so as to guarantee communication quality.

In addition, scheduling at the fixed position may also mean that the N1-th to N2-th symbols are used to indicate a scheduling offset of the SL reference signal with respect to the second SCI or the second DCI, and that the N1-th to N2-th symbols may indicate a specific offset value or may indicate one of configured offset values.

For another example, using the second SCI as an example and assuming that the SCI may include first-stage (Ist) SCI and/or second-stage (2nd) SCI, the first-stage SCI indicates whether scheduling of the SL reference signal is included, or the second-stage SCI indicates one of a time-frequency position or a scheduling offset of the SL reference signal.

(3) A target pattern corresponding to the SL reference signal is indicated by third SCI or third DCI.

In a possible embodiment, there are a plurality of target patterns (or a plurality of types) and the second SCI or second DCI indicates using which target pattern (or which type). For the target pattern, reference may be made to subsequent description of the pattern characteristic, which is not repeated herein.

(4) A scheduling status of the SL reference signal is indicated by fourth SCI or fourth DCI.

It is understood that the first SCI, the second SCI, the third SCI, and the fourth SCI may be the same or different, and the first DCI, the second DCI, the third DCI, and the fourth DCI may be the same or different, which is not limited herein. In addition, for an indication manner of the target pattern and the scheduling status in (3) and (4), reference may be made to the description in (2), which is not repeated herein.

(5) The scheduling status of the SL reference signal is related to second specified information, where the second specified information includes at least one of priority information, resource pool information, channel busy ratio, channel occupancy ratio, QoS parameter, terminal communication range, transmission type, or terminal type that are of the SL reference signal or other signals or channels.

For example, if the channel occupancy ratio is greater than a specific threshold, the SL reference signal cannot be scheduled. For another example, if the terminal communication range is greater than a specific threshold, the SL reference signal cannot be scheduled.

It can be understood that for related descriptions of (1) to (5) in this implementation, reference may be made to the description in the foregoing implementations, and to avoid repetition, details are not repeated herein.

On the basis of the foregoing content, in order to further ensure reliability of an SL-based positioning result, the following describes parameter configuration of the SL reference signal in terms of sequence characteristic, frequency domain characteristic, time domain characteristic, symbol characteristic, and signal pattern characteristic, and reference objects included in the SL reference signal.

1. Sequence Characteristic

The sequence characteristic of the SL reference signal may carry at least one of the following (1) to (6).

(1) Fourth specified information, where the fourth specified information includes at least one of user identification information (for example, identification information of one or more users), user group identification information, user time information, user time source information, signal scrambling information, or cyclic redundancy check (CRC) information.

(2) Fifth specified information, where the fifth specified information includes at least one of a cyclic shift, a cyclic shift pair, or a cyclic shift group.

The cyclic shift value may be $(0, \ldots, 4)$ or $(0, \ldots, 8)$.

In an implementation, a selected comb may correspond to different cyclic shifts, for example, (comb8, cyclic shift 0), (comb8, cyclic shift 1), (comb8, cyclic shift 2), $\ldots$, and (comb8, cyclic shift 8); or different combs correspond to different maximum cyclic shifts, for example, (comb8, maximum cyclic shift 6), (comb12, maximum cyclic shift 4), (comb4, maximum cyclic shift 12), $\ldots$, and (comb1, maximum cyclic shift 48).

(3) Sixth specified information, where the sixth specified information includes at least one of transport channel information, transmission resource information, resource pool information, or bandwidth part (BWP) information that are corresponding to the SL reference signal.

(4) Seventh specified information, where the seventh specified information includes reference object identification information, and the reference object includes a reference signal or a reference signal set. For example, the reference object identification information may be identification information of the reference object, for example, a resource identifier or a resource set identifier.

(5) Specified resource information, where the specified resource information is resource information used for sending the SL reference signal. The specified resource information may include transmission occasion information for sending the SL reference signal, such as subframe, symbol, frame number, and coordinated universal time (UTC).

It can be understood that the SL may include a physical resource, a resource usable for SL (for example, a time domain set of all preset SL resource pools), and an SL logical resource (for example, an SL resource of one preset resource pool). Based on this, the specified resource information provided in this embodiment may be SL resource information or SL logical resource information.

(6) Geographic location information of a specified terminal, where the specified terminal includes the first terminal and/or the second terminal. The geographic location information may be latitude and longitude information, altitude information, floor information, environmental information, beacon ID, or the like of a location in which the specified terminal is located.

2. Pattern Characteristic

The SL reference signal may include at least one target pattern, and each of the target patterns may have a predetermined reference signal pattern.

For example, assuming that the SL reference signal is SRS, FIG. 5A, FIG. 5B, FIG. 5C, FIG. 5D, FIG. 5E, FIG. 5F, FIG. 6A, FIG. 6B, FIG. 6C, FIG. 6D, FIG. 6E, FIG. 6F, and FIG. 6G are examples of partial SRS patterns described in this embodiment. It should be noted that the drawings are only part of possible patterns and that symbol positions and resource element (RE) start positions can be adjusted. In addition, in a case that the SL reference signal is other signals, for the patterns of the other signals, reference may be made to the foregoing description of the SRS patterns, and details are not repeated herein.

In an implementation, a target pattern characteristic corresponding to the target pattern has a correspondence with at least one of the following: density, code division multiplexing (CDM) type, the number of ports, comb (Comb) value, the number of symbols, resource element (RE) offset, SL symbol type, symbol position, bandwidth, positioning requirement, sequence characteristic, transport channel, transmission resource, resource pool, or BWP that are corresponding to the SL reference signal.

The bandwidth may include at least one of a bandwidth of physical sidelink shared channel (PSSCH), a bandwidth of resource pool, a bandwidth of BWP, or a bandwidth of positioning frequency layer.

In another implementation, the target pattern characteristic may be determined with reference to a predetermined automatic gain control (AGC) manner. For example, the predetermined AGC manner includes at least one of the following (1) to (4).

(1) Performing repetition on a specified symbol in the SL reference signal for K times, where K>1.

Figure 6A:
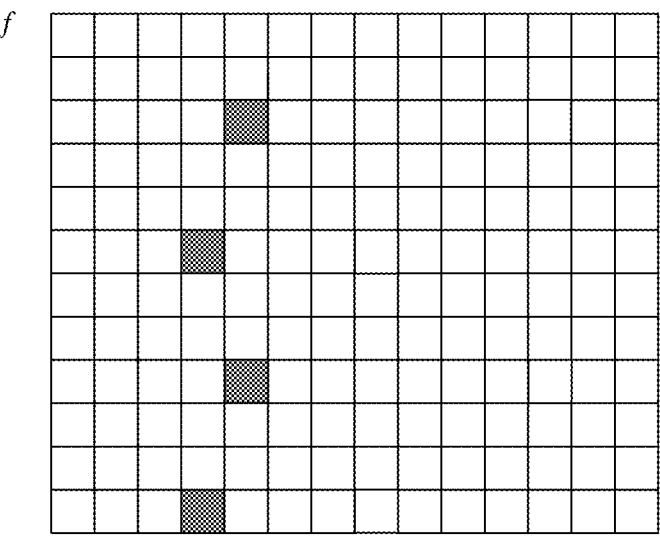
FIG. 6A, FIG. 6B, FIG. 6C, FIG. 6D, FIG. 6E, FIG. 6F, FIG. 6G, FIG. 6H, and FIG. 6I are schematic diagrams of target patterns according to another example embodiment of this application.
Figure 6B:
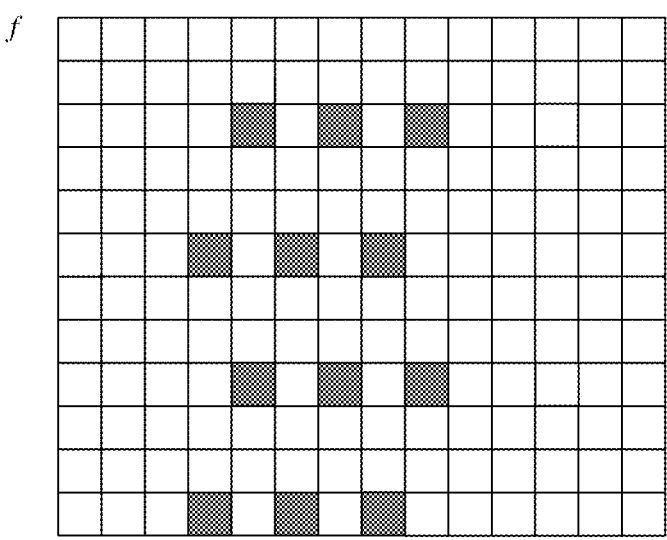
Figure 6C:
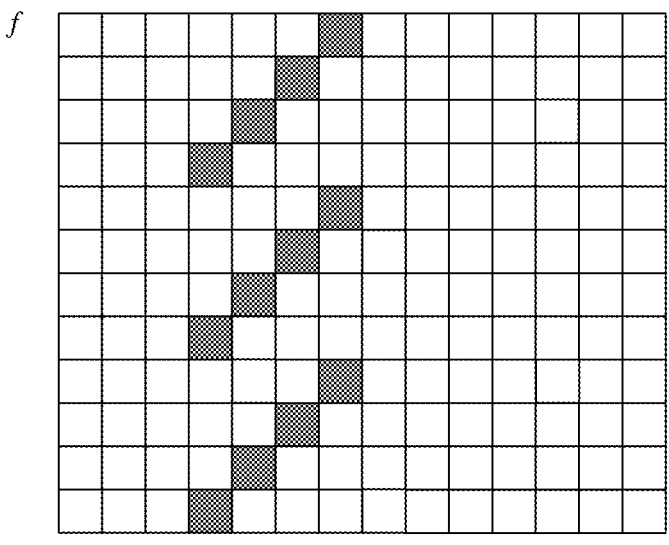
Figure 6D:
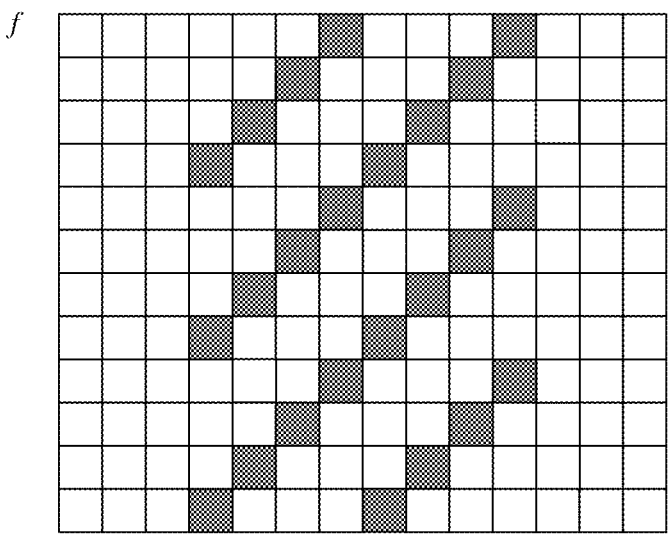
Figure 6E:
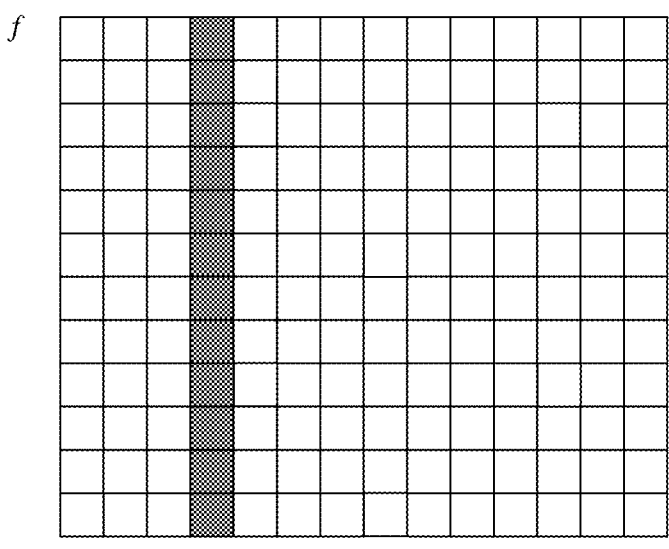
Figure 6F:
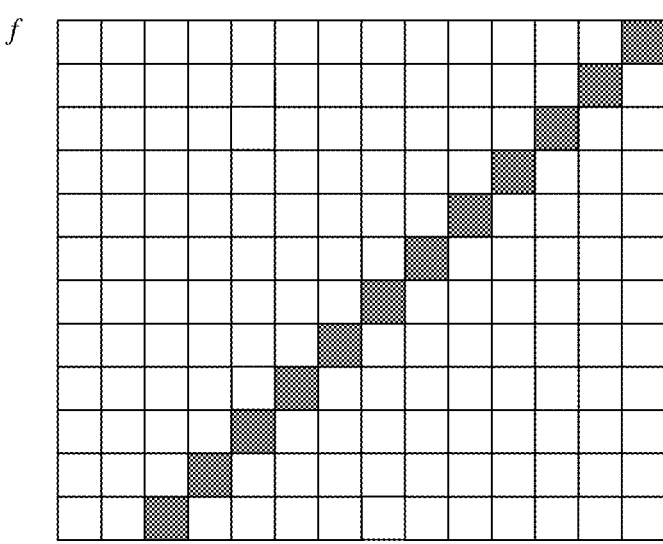
Figure 6G:
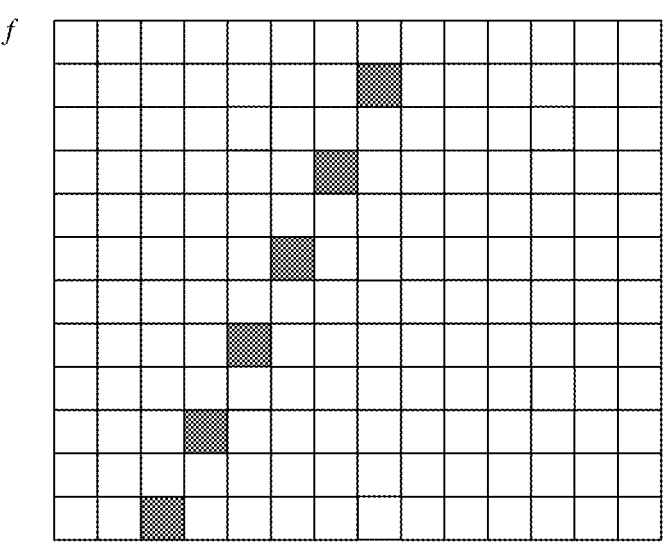
Figure 6H:
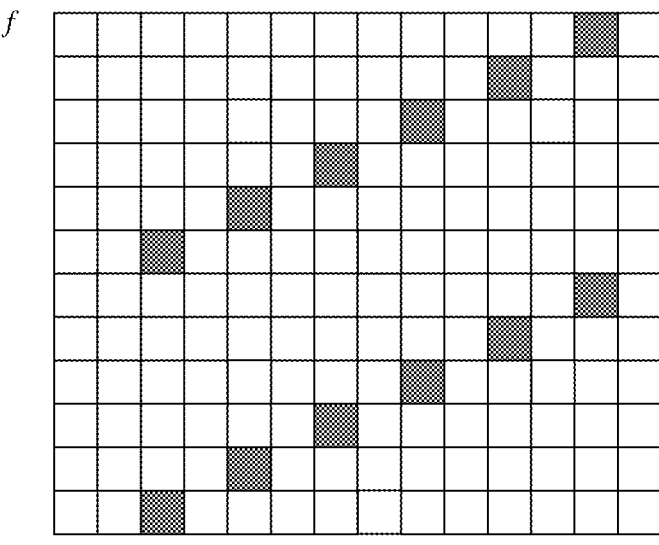
Figure 6I:
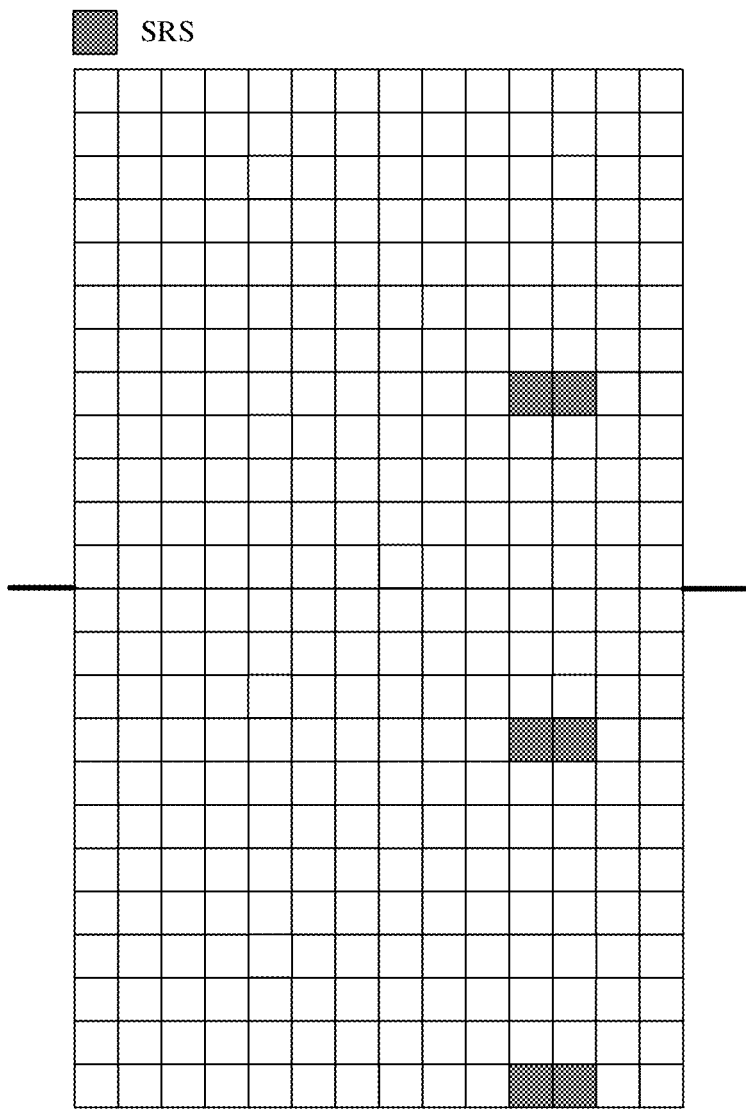

Repetition may be performed on one or more symbols, as shown in FIG. 6I, where it should be noted that a non-contiguous symbol pattern is indicated in FIG. 6I.

(2) Controlling the number of symbols in the SL reference signal to be greater than 1, for example, those shown in FIG. 5A, FIG. 5B, FIG. 5C, and FIG. 5D.

The number of positioning symbols in use is greater than 1. In a case of a position requiring AGC, the previous symbol or N/2 symbols are used for AGC; and in a scenario requiring no modulation, all can be used for location measurement.

(3) The SL reference signal is sent after the eighth specified information, where the eighth specified information includes at least one of second-stage SCI, demodulation reference signal (DMRS), or phase tracking reference signal (PTRS).

It should be noted that in the foregoing (3), sending the SL reference signal after the eighth specified information is equivalent to performing AGC modulation using other signals or channels (for example, the eighth specified information).

(4) Configuring a measurement gap

AGC modulation of the target pattern characteristic is implemented by configuring a measurement gap, that is, no signal or data is sent before the SL reference signal.

3. Frequency Domain Characteristic

Figure 4:
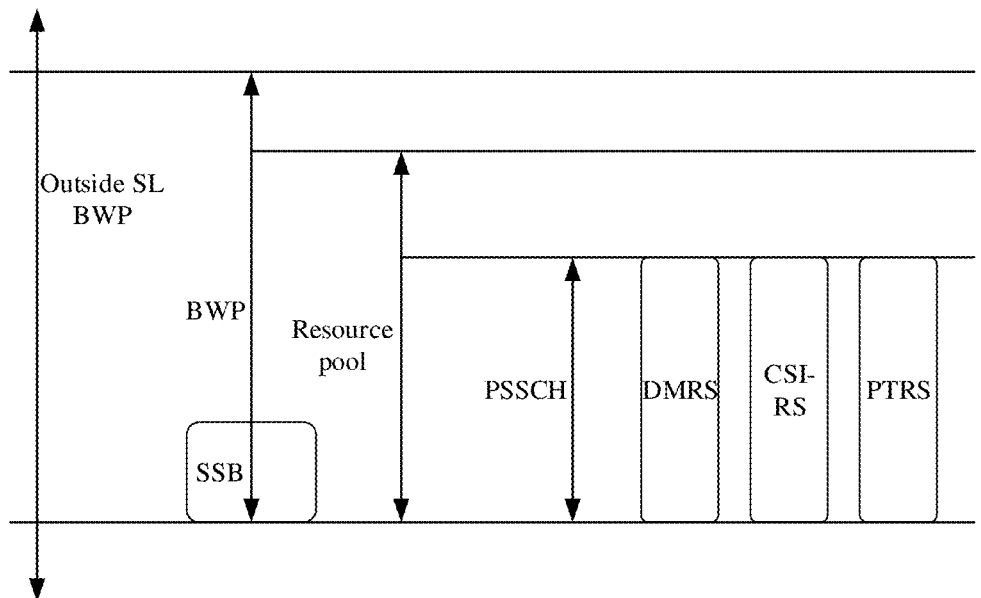
FIG. 4 is a schematic diagram of a frequency domain resource allocation mode according to an example embodiment of this application.

Referring to FIG. 4, the target frequency domain information corresponding to the SL reference signal may include at least one of subcarrier spacing (SCS), offset information of a start RE, or bandwidth. In an implementation, the target frequency domain information may be determined based on at least one of the following (1) to (10).

(1) Configuration information of a bandwidth part.

The configuration information of the BWP may be configured by the terminal or the network-side device, or specified by the protocol. In this embodiment, that the target frequency domain information is determined based on the configuration information of the BWP includes any one of the following (a) to (n):

(a) configuration information of each BWP in the SL reference signal;
(b) a start point of the SL reference signal being equal to a start point of the BWP;

(c) the start point of the SL reference signal being greater than the start point of the BWP;
(d) a frequency domain range of the SL reference signal being within the BWP;
(e) the frequency domain range of the SL reference signal being less than a frequency domain range of the BWP;
(f) the frequency domain range of the SL reference signal being equal to the frequency domain range of the BWP;
(g) a subcarrier spacing of the SL reference signal being the same as a subcarrier spacing of the BWP;
(h) the subcarrier spacing of the SL reference signal being an integer multiple of the subcarrier spacing of the BWP;
(i) a beam of the SL reference signal being consistent with a beam associated with the BWP;
(j) a start symbol of the SL reference signal being a symbol start position of the BWP;
(k) the start symbol of the SL reference signal being a first predetermined symbol, where the first predetermined symbol has a fixed offset relative to the symbol start position of the BWP;
(l) a symbol length of the SL reference signal being less than a symbol length of the BWP;
(m) the symbol length of the SL reference signal being equal to the symbol length of the BWP; or
(n) priority information of the SL reference signal being determined based on priority information of the BWP.

(2) Configuration information of a resource pool.

For example, that the target frequency domain information is determined based on the configuration information of the resource pool includes any one of the following (a) to (n):

(a) configuration information of each resource pool in the SL reference signal;
(b) a start point of the SL reference signal being equal to a start point of the resource pool;
(c) the start point of the SL reference signal being greater than the start point of the resource pool;
(d) a frequency domain range of the SL reference signal being within the resource pool;
(e) the frequency domain range of the SL reference signal being less than a frequency domain range of the resource pool;
(f) the frequency domain range of the SL reference signal being equal to the frequency domain range of the resource pool;
(g) a subcarrier spacing of the SL reference signal being the same as a subcarrier spacing of the resource pool;
(h) the subcarrier spacing of the SL reference signal being an integer multiple of the subcarrier spacing of the resource pool;
(i) a beam of the SL reference signal being consistent with a beam associated with the resource pool;
(j) a start symbol of the SL reference signal being a symbol start position of the resource pool;
(k) the start symbol of the SL reference signal being a first predetermined symbol, where the first predetermined symbol has a fixed offset relative to the symbol start position of the resource pool;
(l) a symbol length of the SL reference signal being less than a symbol length of the resource pool;
(m) the symbol length of the SL reference signal being equal to the symbol length of the resource pool; or
(n) priority information of the SL reference signal being determined based on priority information of the resource pool.

(3) Transport channel information.

For example, that the target frequency domain information is determined based on the information of the transport channel includes any one of the following (a) to (n):

(a) configuration information of each transport channel in the SL reference signal;

(b) a start point of the SL reference signal being equal to a start point of the transport channel;

(b) the start point of the SL reference signal being greater than the start point of the transport channel;

(d) a frequency domain range of the SL reference signal being within the transport channel;

(e) the frequency domain range of the SL reference signal being less than a frequency domain range of the transport channel;

(f) the frequency domain range of the SL reference signal being equal to the frequency domain range of the transport channel;

(g) a subcarrier spacing of the SL reference signal being the same as a subcarrier spacing of the transport channel;

(h) the subcarrier spacing of the SL reference signal being an integer multiple of the subcarrier spacing of the transport channel;

(i) a beam of the SL reference signal being consistent with a beam associated with the transport channel;

(j) a start symbol of the SL reference signal being a symbol start position of the transport channel;

(k) the start symbol of the SL reference signal being a first predetermined symbol, where the first predetermined symbol has a fixed offset relative to the symbol start position of the transport channel;

(l) a symbol length of the SL reference signal being less than a symbol length of the transport channel;

(m) the symbol length of the SL reference signal being equal to the symbol length of the transport channel; or (n) priority information of the SL reference signal being determined based on priority information of the transport channel.

(4) Information of a target frequency domain start point.

The target frequency domain start point is at least one of the following: a target start point and/or a frequency domain position obtained by performing fixed frequency domain shift relative to the target start point. The target start point includes any one of a BWP start point, a resource pool frequency domain start point, a transport channel start point, and an absolute frequency domain position. The offset value of the fixed frequency domain offset may be configured by the terminal or the network side, or specified by the protocol, which is not limited in this embodiment.

(5) Information of a target frequency domain offset.

The target frequency domain offset may be determined according to at least one of the following: frequency domain granularity; target frequency domain start point; or symbol information of the SL reference signal.

(6) Symbol information of the SL reference signal, where, for example, the information of the target frequency domain offset is different for different symbols, and for another example, the information of the target frequency domain offset is different for each symbol in different number of symbols.

(7) Ninth specified information, where the ninth specified information includes at least one of a synchronization signal block (SSB), a PTRS, a DMRS, or a channel state information-reference signal (CSI-RS).

(8) Information about a target signal group corresponding to the SL reference signal, where, for example, different target signal groups correspond to different target frequency information, and a same target signal group corresponds to same target frequency information. It can also be understood that configuration is performed once for the target signal group, that is, the same configuration is used for the target signal group.

(9) Information about a reference object included in the SL reference signal, where the reference object includes a reference signal or a reference signal resource set, where, for example, different reference objects correspond to different target frequency information; and it can also be understood as configuration is performed once for each reference object, that is, the same configuration is used for the reference object.

(10) A predetermined frequency range.

Assuming that the predetermined frequency is a BWP, the determining, based on the predetermined frequency range, target frequency domain information corresponding to the SL reference signal includes: a frequency domain position corresponding to the SL reference signal exceeds a predetermined BWP range, or the frequency domain position corresponding to the SL reference signal is less than the predetermined BWP range, or the frequency domain position corresponding to the SL reference signal covers the predetermined BWP range, or the frequency domain position corresponding to the SL reference signal has no correspondence with the predetermined BWP range.

4. Time Domain Characteristic

The target time domain information corresponding to the SL reference signal includes at least one of transmission occasion, transmission time interval, or transmission quantity within a predetermined duration.

In an implementation, the target time domain information may be determined based on at least one of the following (1) to (12).

(1) Configuration information of a BWP.

The configuration information of the BWP may include a BWP range, BWP offset information, a BWP ID, SL configuration information, configuration information of a sounding reference signal (SRS), or the like.

(2) Configuration information of a resource pool.

The configuration information of the resource pool may include resource pool ID, transport channel configuration information, SL synchronization information, SL start resource block (RB) information, SL time information, SL signal information, SL window information, SL power information, or the like.

(3) Configuration information of a transport channel.

The transport channel configuration information may include a transport channel start position or the like.

(4) Any one of SSB, phase tracking reference signal, demodulation reference signal, and channel state information reference signal.

(5) A specified signal within the predetermined monitoring window, where the specified signal includes at least one of RSRP, RSRQ, SN, RSSI, CR, or CBR.

(6) Information of a target time domain start point, where the information of the target time domain start point may be any one of a start point of a BWP, a start point of a resource pool, a start point of a transport channel, an absolute time, a system frame number (SFN), and a slot time; or may be an offset time relative to the start point of the BWP, the start point of the resource pool, the start point of the transport channel, the absolute time, the SFN, and the slot time.

(7) Information of the target time domain offset, where the information of the target time domain offset may be an offset time relative to the start point or may be a duration of the SL reference signal.

(8) Symbol information of the SL reference signal, where the symbol information may be a symbol number, or may be the number of symbols, a symbol length, a symbol start or end position, or the like.

Figure 5A:
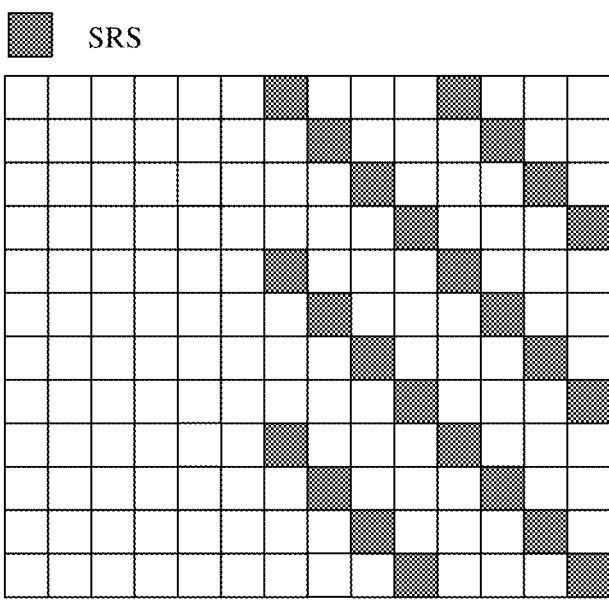
FIG. 5A, FIG. 5B, FIG. 5C, FIG. 5D, FIG. 5E, and FIG. 5F are schematic diagrams of target patterns according to an example embodiment of this application.
Figure 5B:
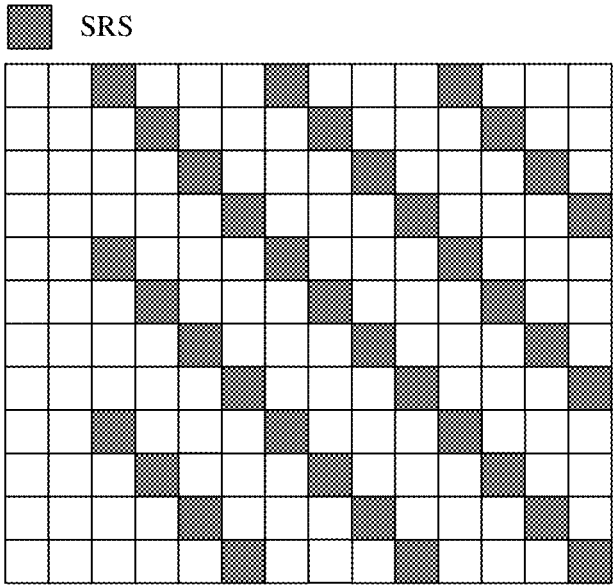
Figure 5C:
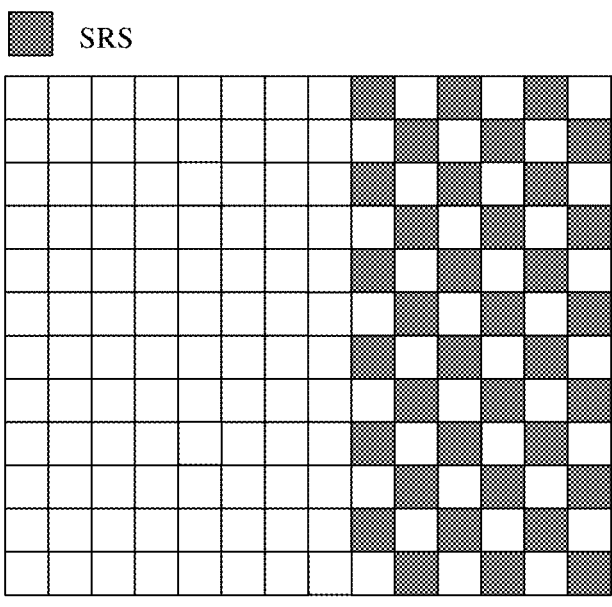
Figure 5D:
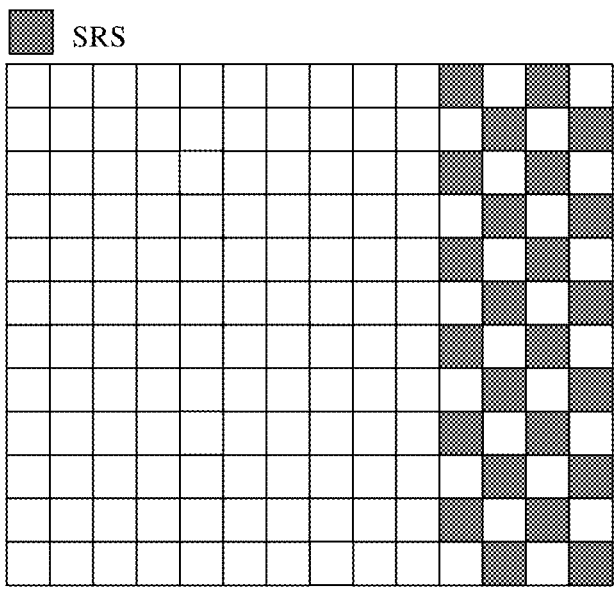
Figure 5E:
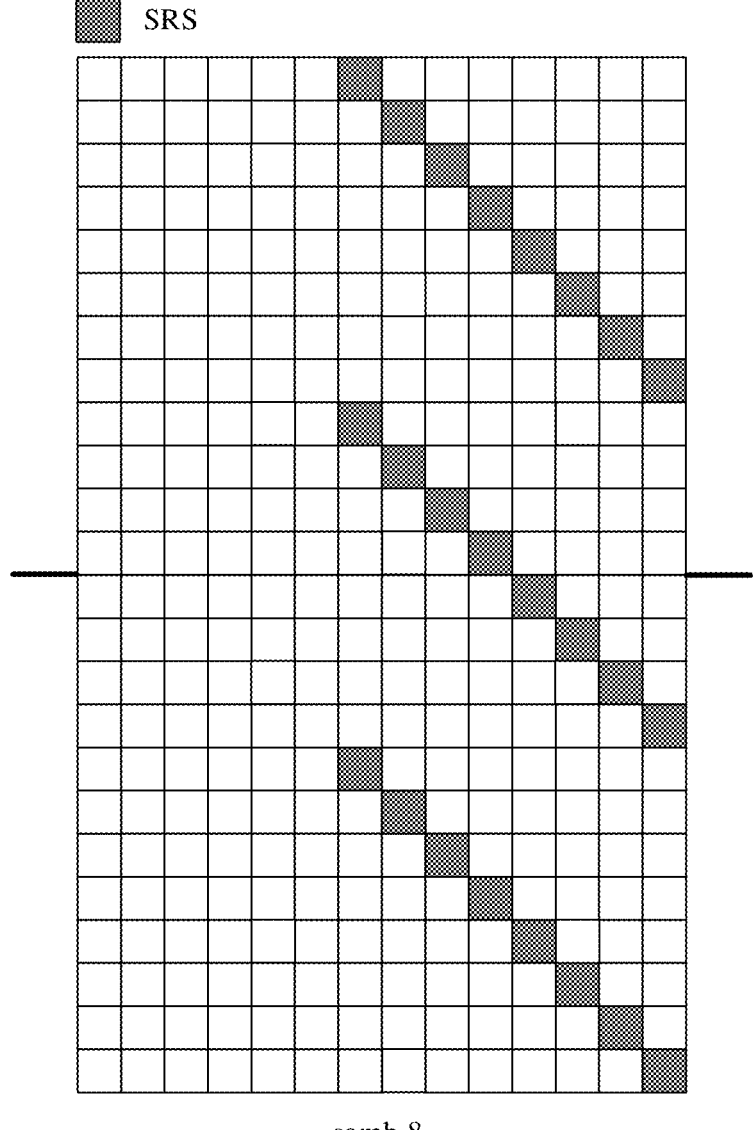
Figure 5F:
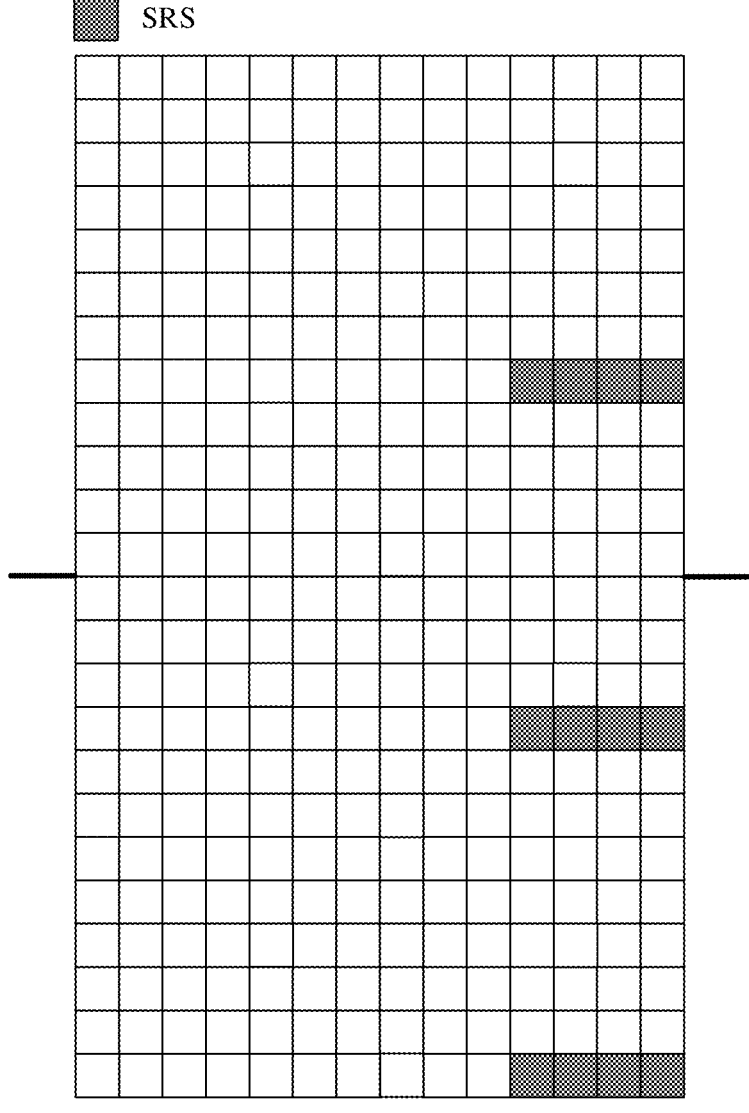

(9) Target pattern information included in the SL reference signal, where for the target pattern, reference may be made to the descriptions in FIG. 5A, FIG. 5B, FIG. 5C, and the like.

(10) Information about a target signal group corresponding to the SL reference signal, where for example, different target signal groups correspond to different target time domain information, and a same target signal group corresponds to same target time domain information. It can also be understood that configuration is performed for each target signal group, that is, the same configuration is used for the target signal group.

(11) Information about a reference object included in the SL reference signal, where the reference object includes a reference signal or a reference signal resource set.

The information about the reference object may be a reference signal resource identifier, a reference signal resource set identifier, resource allocation information, spatial direction information, power information, transmission occasion information, transmitting user information, receiving user information, or the like, which is not limited in this embodiment.

(12) SL discontinuous reception (DRX) configuration information.

In an embodiment, if a periodicity is less than a DRX cycle, transmission is performed based on the DRX cycle; or if the periodicity is greater than the period of DRX, transmission is performed based on the DRX cycle. In another embodiment, transmission of the SL reference signal is not related to DRX.

In addition, it should be noted that the target time domain information may alternatively be different from time domain position information of eleventh specified information, where the eleventh specified information includes at least one of second-stage SCI, DMRS, or PTRS.

5. Symbol Characteristic

Symbols included in the SL reference signal satisfy at least one of the following (1) to (9):

(1) a frequency domain offset between the symbols being the same;

(2) a time domain offset between the symbols being the same;

(3) a symbol sequence formed by the symbols being in a shape of ladder or comb;

(4) a time-domain relative offset of the symbols being determined according to a first predetermined rule; where the first predetermined rule may be that a time domain relative offset between the symbols may be set based on a pre-configured comb structure, may be the same, may be set randomly, or may have a correspondence with a comb or a symbol position or number, which is not limited in this embodiment;

(5) a frequency-domain start offset of the symbols being determined according to a second predetermined rule; where the second predetermined rule is similar to the first predetermined rule, which is not repeated herein;

for example, the start position in time domain is placed only on symbol 0248, and the start position in frequency domain is placed only at 0123, 0231, or the like, which is not limited in this embodiment;

(6) a relative offset of the symbols being not greater than a comb size corresponding to the SL reference signal; where in a possible embodiment, the relative offset of each of the symbols is 0;

(7) a relative offset of the symbols being not greater than a total number of symbols corresponding to the SL reference signal;

(8) the number of symbols of the SL reference signal being corresponding to the reference object identification information, where the reference object includes a reference signal or a reference signal resource set; or (9) symbol information of a target symbol being corresponding to tenth specified information, where the symbol information of the target symbol includes the number of symbols in the SL reference signal and a symbol offset of the target symbol, and the tenth specified information includes at least one of transport channel information, transmission resource information, resource pool information, or BWP that are corresponding to the SL reference signal.

6. Reference Object

Depending on actual positioning requirements, the SL reference signal includes different information, for example, the SL reference signal may include information about at least one reference object, and the reference object includes a reference signal resource or a reference signal resource set. The information about the reference object includes at least one of the following (1) to (5):

(1) reference object identification information; for example, the reference signal resource identifier or the reference signal resource set identifier, (2) third specified information, where the third specified information includes at least one of resource allocation information, spatial direction information, power information, transmission occasion, transmitting user, or receiving user;

(3) geographic location information of a specified terminal, where the specified terminal includes the first terminal and/or the second terminal; and difference between the specified terminals may be construed as presence of a correspondence between transmission of the SL reference signal by the first terminal and specified geographic location information, or as presence of a correspondence between measurement of the SL reference signal by the second terminal and the specified geographic location information; and in this embodiment, if positioning calculation or measurement is performed only within a specific distance range, the geographic location information may include zone (zone) information, latitude and longitude information, altitude information, communication range information, cell information, or the like;

(4) specified synchronization information, where the specified synchronization information includes a synchronization reference signal and/or a synchronization resource; and a case with the information about the reference object including the specified synchronization information can be construed as positioning measurement and calculation needing to be performed for terminals (or users) that have the same synchronization reference information; and (5) time stamp information, where the time stamp information includes at least one of absolute time, coordinated universal time, frame number, or relative time information.

It should be noted that with the configuration information of the SL reference signal in the foregoing 1 to 6, reliability during terminal positioning based on the SL reference signal can be effectively ensured. In an implementation, the SL reference signal may have at least one configuration of the foregoing 1 to 6, that is, the SL reference signal may have one or more of sequence characteristic, frequency domain characteristic, time domain characteristic, symbol characteristic, signal pattern characteristic, and reference object that are described above, which is limited herein in this embodiment.

Figure 7:
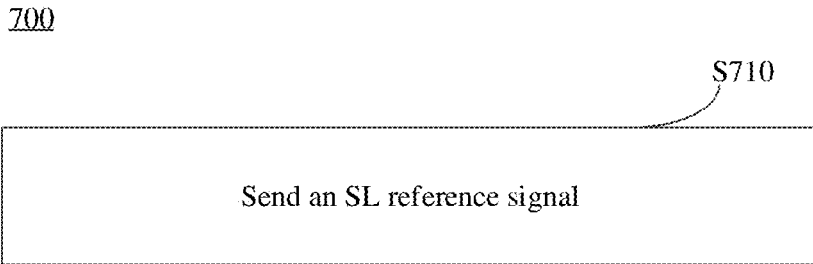
FIG. 7 is a schematic flowchart of an SL-based positioning method according to an example embodiment of this application.

As shown in FIG. 7, FIG. 7 is a schematic flowchart of an SL-based positioning method 700 according to an example embodiment of this application. The method 700 may be performed by a first terminal, for example, by software and/or hardware installed on the first terminal. The method 700 may include the following steps.

S710. Send an SL reference signal.

For the implementation process of S710, in addition to the descriptions of the foregoing method embodiments, in a possible implementation, the sending an SL reference signal may include at least one of the following (1) to (4).

(1) Sending the SL reference signal along with target SCI.

The target SCI includes first-stage SCI and/or second-stage SCI.

In this embodiment, at least one of the following (a) to (d) may be carried in the target SCI.

(a) Configuration information of the SL reference signal

The configuration information may be first resource information, first period information, terminal identification information, first time domain information, first power information, and first spatial information that are corresponding to the SL reference signal; or a sequence characteristic, a frequency domain characteristic, a time domain characteristic, a symbol characteristic, or a signal pattern characteristic that are corresponding to the SL reference signal; and the like.

(b) Auxiliary information of the SL reference signal.

The auxiliary information may be at least one of a terminal identifier for sending the SL reference signal, a terminal location for sending the SL reference signal, a terminal identifier for receiving the SL reference signal, or a terminal location for receiving the SL signal.

(c) Measurement request information of the SL reference signal.

(d) Measurement request information of the SL reference signal.

(2) Sending the SL reference signal along with a target SSB.

In an implementation, at least one of the following (a) to (d) of the SL reference signal corresponds to the target SSB:

(a) target frequency domain information;

(b) target time domain information;

(c) signal sequence information; or (d) signal synchronization information.

(3) Sending the SL reference signal along with a target transport channel.

In an implementation, at least one of the following (a) to (d) of the SL reference signal corresponds to the target transport channel:

(a) target frequency domain information;

(b) target time domain information;

(c) signal sequence information; or (d) signal synchronization information.

(4) Sending the SL reference signal separately.

For example, the SL reference signal may be sent independently of SCI or other signals/channels.

Figure 8A:
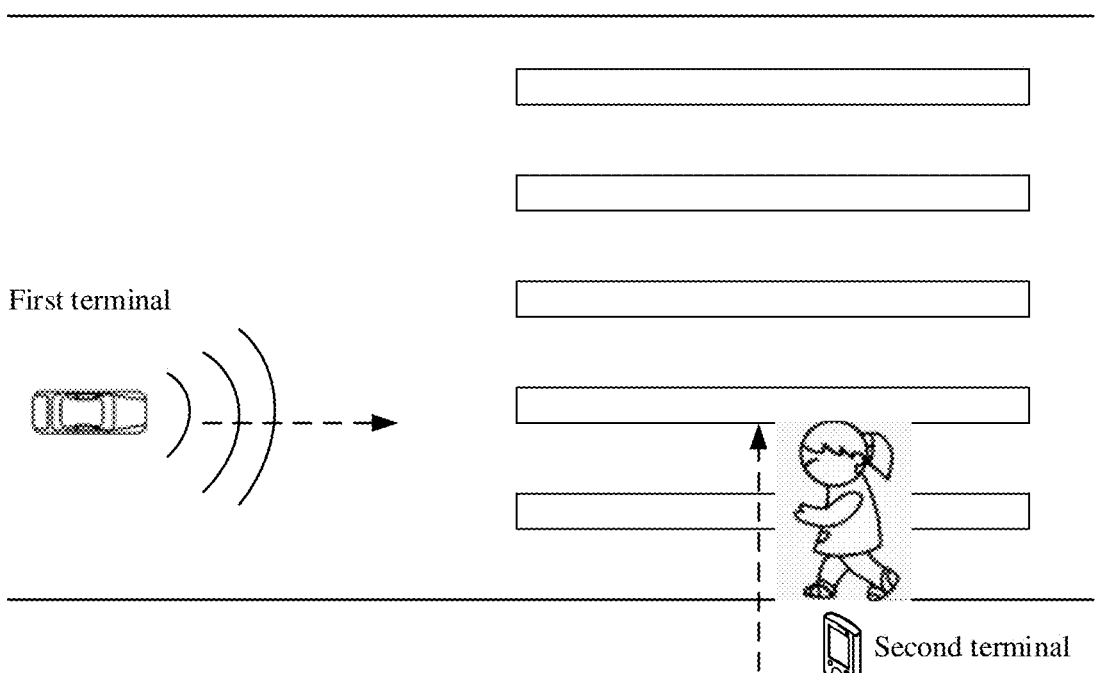
FIG. 8A and FIG. 8B are schematic diagrams of application scenarios of an SL-based positioning method according to an example embodiment of this application.

Depending on a positioning requirement/scenario, the SL reference signal may include reference signals corresponding to at least one target signal group. Assuming that the positioning scenario is shown in FIG. 8A, it can be understood that one target signal group corresponds to signals of one vehicle group.

In this embodiment, the target signal group may satisfy any one of the following (1) to (5).

(1) different target signal groups correspond to different target signal group identifiers;

(2) different target signal groups correspond to different reference objects, where the reference object includes a reference signal or a reference signal set;

(3) different target signal groups are mapped to different resource pools;

(4) different target signal groups correspond to different positioning requirements; and (5) different target signal groups correspond to different reference signal types.

The reference signal type may include at least one of a first type SL reference signal, a second type SL reference signal, or a third type SL reference signal.

(a) The first type SL reference signal carries a broadcast identifier ID (for example, a cell ID or a scrambling ID) or/and a type ID. For purposes of relative positioning of VUEs, PUEs, or the like to avoid anti-collision and so on, in this case, the type ID carried in the first type SL reference signal is used for distinguishing a type of the SL reference signal being sent, with no need to distinguish which terminal. It should be noted that the type ID may be predefined or assigned.

For example, refer to FIG. 8A. In this scenario, an RSU sends an SL reference signal, and a VUE determines, based on the received SL reference signal, a distance between the VUE and a toll station or a colliding terminal, and stops when a measurable distance is reached.

The SL reference signal sent by the RSU is merely required to allow the VUE to identify the RSU being such type. If the signal is sent by the vehicle, a vehicle ID needs to be identified, with a feedback.

Figures 8B, 9:
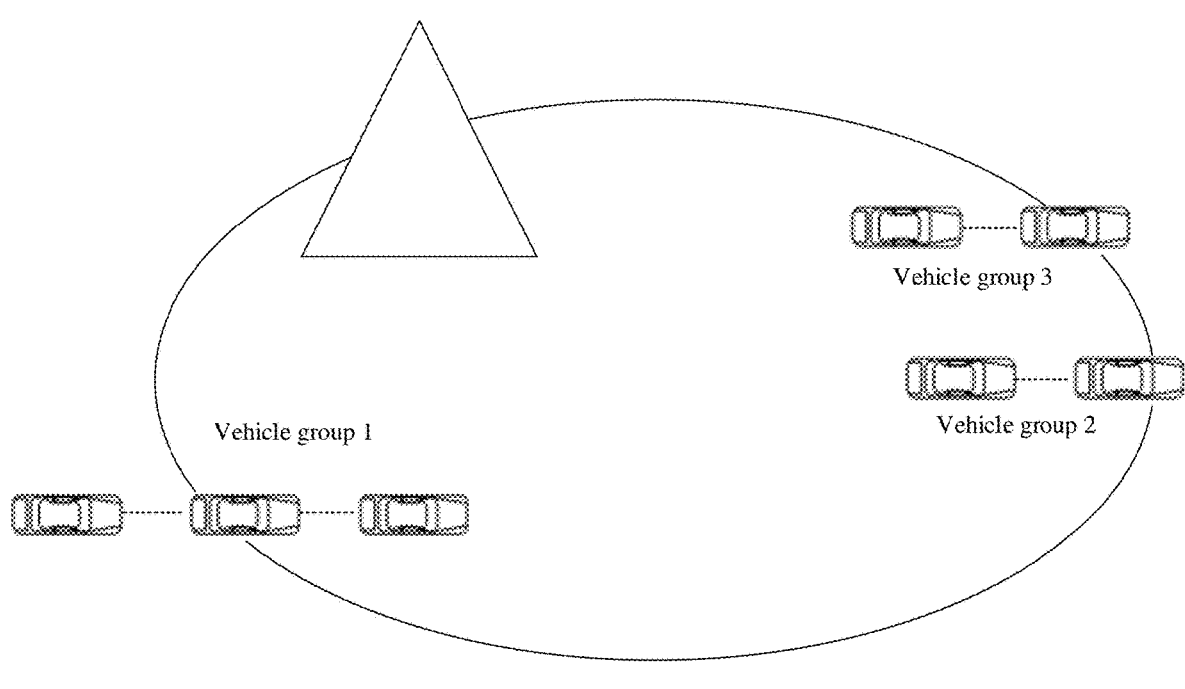
FIG. 9 is a schematic flowchart of an SL-based positioning method according to still another example embodiment of this application.

In addition, in a scenario shown in FIG. 8B, an involved resource allocation mode may include that the network-side device pre-configures resources and the first terminal randomly selects or preempts a resource to send the SL reference signal. For the frequency domain resource and time domain resource involved therein, reference may be made to the foregoing descriptions, and details are not repeated herein.

For another example, this method may also be used in IIOT scenarios, in smart cargo storage, or in smart carts returning to charging lights.

(b) The second type SL reference signal carries a group ID. The second type SL reference signal may be used for groupcast to identify relative locations of users of a group. In this case, the group ID carried in the second type SL reference signal is used to uniquely identify different users in a same group.

It should be noted that resources of the SL reference signal for different users of the same group may be classified according to pre-configuration, predefinition, group ID, and intra-group ID.

For example, referring to FIG. 8B, using three traveling vehicle groups (corresponding to three target signal groups) as an example, the second type SL reference signal may be used for determining a relative displacement between vehicles within the vehicle group. The involved resource allocation modes may include: 1. being configured by the network-side device; and 2. being pre-configured by the network side+allocating a resource for a terminal at a specified location, where the terminal at the specified location may be a first terminal, an intermediate terminal, the last terminal, or other terminals at any locations. For example, a resource requirement and a positioning requirement may be reported by UE at the specified location, multiple short resources can be allocated (being sent and fed back), and the first terminal needs to preempt a reserved resource (including that of the second terminal).

(c) The third type SL reference signal carries a terminal ID or/and a signal ID. The third type SL reference signal may be used for unicast, and a terminal ID or/and signal ID carried thereon may be used for user identification.

For example, the third type SL reference signal can be applied to scenarios requiring unique identification, for example, AGV (automated guided vehicle), drone, and vehicle sharing. During resource configuration, the network-side device can implement resource configuration, for example, configuring the resource for terminals requiring rescue.

In this embodiment, different types of SL reference signals are defined, so as to further improve reliability of terminal positioning results and adapt to positioning requirements under V2X.

As shown in FIG. 9, FIG. 9 illustrates an SL-based positioning method 900 according to an example embodiment of this application. The method 900 may be performed by a second terminal, for example, by software and/or hardware installed on the second terminal. The method 900 may include the following steps.

S910: Receive an SL reference signal sent by a first terminal.

S920: Perform a predetermined operation based on the SL reference signal, where the predetermined operation includes at least one of the following (1) to (4):
    (1) determining a location of the first terminal;
    (2) determining a relative location between the first terminal and the second terminal;
    (3) determining a location of the second terminal; or
    (4) determining a distance between the first terminal and the second terminal.

In this embodiment, the second terminal performs at least one of the following based on the received SL reference signal: determining the location of the first terminal; determining the relative location between the first terminal and at least one of second terminal; determining the location of at least one of second terminal; or determining the distance between the first terminal and at least one of second terminal, thereby implementing terminal positioning on SL and adapting to terminal positioning service requirements in V2X scenarios.

Figure 10:
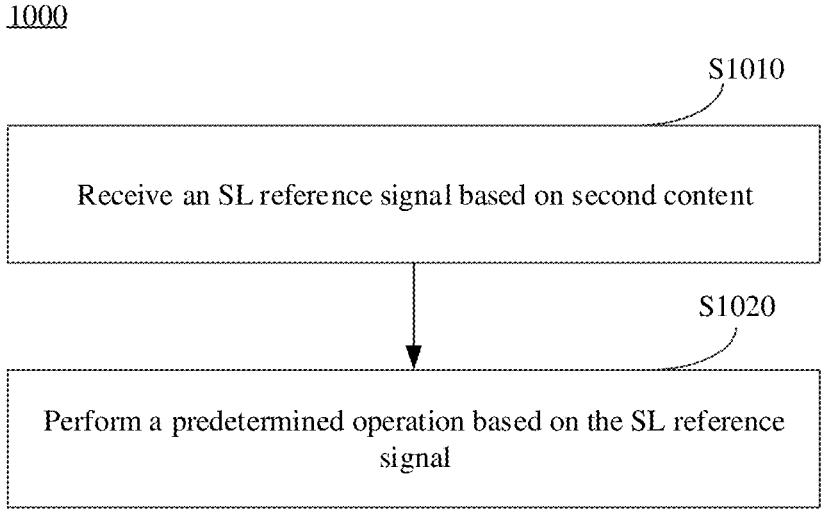
FIG. 10 is a schematic flowchart of an SL-based positioning method according to still another example embodiment of this application.

As shown in FIG. 10, FIG. 10 illustrates an SL-based positioning method 1000 according to an example embodiment of this application. The method 1000 may be performed by a second terminal, for example, by software and/or hardware installed on the second terminal. The method 1000 may include the following steps.

S1010: Receive an SL reference signal based on second content, where the second content includes at least one of the following (1) to (5):
    (1) a third scheduling request, where the third scheduling request indicates a network-side device to schedule to receive the SL reference signal;
    (2) a fourth scheduling request, where the fourth scheduling request indicates a third terminal to schedule to receive the SL reference signal;

(3) pre-configured requirement;
    (4) pre-configured resource configuration; or
    (5) predetermined indication.

S1020: Perform a predetermined operation based on the SL reference signal.

For the implementation process of S1010 and S1020, in addition to the descriptions of the foregoing method embodiments, in a possible implementation, the SL reference signal satisfies at least one of the following (1) to (5):
    (1) a position for receiving the SL reference signal is independent;
    (2) a position for receiving the SL reference signal is indicated by fifth SCI or fifth DCI, where the fifth SCI may be the same as or different from the foregoing first SCI, and the fifth DCI may be the same as or different from the foregoing first DCI, which is not limited in this embodiment;
    (3) the SL reference signal is a reference signal with a target pattern;
    (4) a receiving status of the SL reference signal is indicated by the first SCI or the first DCI; or
    (5) a receiving status of the SL reference signal is associated with first specified information, where the first specified information includes at least one of priority information, resource pool information, channel busy ratio, channel occupancy ratio, quality of service QoS parameter, terminal communication range, transmission type, or terminal type.

In another implementation, in a case of receiving the SL reference signal according to the first scheduling request or the second scheduling request, the SL reference signal satisfies at least one of the following (1) to (5).
    (1) A scheduling position of the SL reference signal exceeds the range of the first SL resource.
    (2) The scheduling position of the SL reference signal is indicated by second SCI or second DCI.
    (3) A target pattern corresponding to the SL reference signal is indicated by third SCI or third DCI.
    (4) A scheduling status of the SL reference signal is indicated by fourth SCI or fourth DCI.

It should be noted that the second SCI, third SCI, and fourth SCI described in the foregoing (2) to (4) may be correspondingly the same or different from the second SCI, third SCI, and fourth SCI described in the foregoing method embodiment 300; similarly, the second DCI, third DCI, and fourth DCI described the foregoing (2) to (4) may be correspondingly the same or different from the second DCI, third DCI, and fourth DCI described in the foregoing method embodiment 300, which is not limited in this embodiment.
    (5) The scheduling status of the SL reference signal is related to second specified information, where the second specified information includes at least one of priority information, resource pool information, channel busy ratio, channel occupancy ratio, quality of service QoS parameter, terminal communication range, transmission type, or terminal type.

On the basis of the foregoing content, the following describes parameter configuration of the SL reference signal in terms of sequence characteristic, frequency domain characteristic, time domain characteristic, symbol characteristic, and signal pattern characteristic.

1. Sequence Characteristic

The sequence characteristic of the SL reference signal may carry at least one of the following:
    (1) fourth specified information, where the fourth specified information includes at least one of user identification information, user group identification information, user time information, user time source information, signal scrambling information, or cyclic redundancy check CRC information;

(2) fifth specified information, where the fifth specified information includes at least one of a cyclic shift, a cyclic shift pair, or a cyclic shift group;

(3) sixth specified information, where the sixth specified information includes at least one of transport channel information, transmission resource information, resource pool information, or bandwidth part BWP information that are corresponding to the SL reference signal;

(4) seventh specified information, where the seventh specified information includes reference object identification information, and the reference object includes a reference signal or a reference signal set;

(5) specified resource information, where the specified resource information is resource information used for sending the SL reference signal; or (6) geographic location information of a specified terminal, where the specified terminal includes the first terminal and/or the second terminal.

2. Pattern Characteristic

The SL reference signal includes at least one target pattern.

In a possible implementation, a target pattern characteristic corresponding to the target pattern has a correspondence with at least one of the following: density, code division multiplexing type, the number of ports, comb value, the number of symbols, RE offset, SL symbol type, symbol position, bandwidth, positioning requirement, sequence characteristic, transport channel, transmission resource, resource pool, or BWP that are corresponding to the SL reference signal.

In another implementation, the target pattern characteristic may be determined with reference to a predetermined automatic gain control AGC manner. For example, the predetermined AGC manner includes at least one of the following (1) to (4):

(1) performing repetition on a specified symbol in the SL reference signal for K times, where K>1;

(2) controlling the number of symbols in the SL reference signal to be greater than 1;

(3) sending the SL reference signal after eighth specified information, where the eighth specified information includes at least one of second-stage SCI, a demodulation reference signal, and a phase tracking reference signal; or (4) configuring a measurement gap.

3. Frequency Domain Characteristic

The target frequency domain information corresponding to the SL reference signal may include at least one of subcarrier spacing, offset information of a start RE, or bandwidth.

In an implementation, the target frequency domain information may be determined based on at least one of the following (1) to (10).

For example, that the target frequency domain information is determined based on the configuration information of the BWP includes any one of the following (a) to (n):

(1) Configuration information of a BWP.

(a) configuration information of each BWP in the SL reference signal;

(b) a start point of the SL reference signal being equal to a start point of the BWP;

(c) the start point of the SL reference signal being greater than the start point of the BWP;

(d) a frequency domain range of the SL reference signal being within the BWP;

(e) the frequency domain range of the SL reference signal being less than a frequency domain range of the BWP;

(f) the frequency domain range of the SL reference signal being equal to the frequency domain range of the BWP;

(g) a subcarrier spacing of the SL reference signal being the same as a subcarrier spacing of the BWP;

(h) the subcarrier spacing of the SL reference signal being an integer multiple of the subcarrier spacing of the BWP;

(i) a beam of the SL reference signal being consistent with a beam associated with the BWP;

(j) a start symbol of the SL reference signal being a symbol start position of the BWP;

(k) the start symbol of the SL reference signal being a first predetermined symbol, where the first predetermined symbol has a fixed offset relative to the symbol start position of the BWP;

(l) a symbol length of the SL reference signal being less than a symbol length of the BWP;

(m) the symbol length of the SL reference signal being equal to the symbol length of the BWP; and (n) priority information of the SL reference signal being determined based on priority information of the BWP.

(2) Configuration information of a resource pool.

That the target frequency domain information is determined based on the configuration information of the resource pool includes any one of the following (a) to (n):

(a) configuration information of each resource pool in the SL reference signal;

(b) a start point of the SL reference signal being equal to a start point of the resource pool;

(c) the start point of the SL reference signal being greater than the start point of the resource pool;

(d) a frequency domain range of the SL reference signal being within the resource pool;

(e) the frequency domain range of the SL reference signal being less than a frequency domain range of the resource pool;

(f) the frequency domain range of the SL reference signal being equal to the frequency domain range of the resource pool;

(g) a subcarrier spacing of the SL reference signal being the same as a subcarrier spacing of the resource pool;

(h) the subcarrier spacing of the SL reference signal being an integer multiple of the subcarrier spacing of the resource pool;

(i) a beam of the SL reference signal being consistent with a beam associated with the resource pool;

(j) a start symbol of the SL reference signal being a symbol start position of the resource pool;

(k) the start symbol of the SL reference signal being a first predetermined symbol, where the first predetermined symbol has a fixed offset relative to the symbol start position of the resource pool;

(l) a symbol length of the SL reference signal being less than a symbol length of the resource pool;

(m) the symbol length of the SL reference signal being equal to the symbol length of the resource pool; and (n) priority information of the SL reference signal being determined based on priority information of the resource pool.

(3) Transport channel information.

That the target frequency domain information is determined based on the information of the transport channel includes any one of the following (a) to (n):

(a) configuration information of each transport channel in the SL reference signal; (b) a start point of the SL reference signal being equal to a start point of the transport channel;

(b) the start point of the SL reference signal being greater than the start point of the transport channel;

(d) a frequency domain range of the SL reference signal being within the transport channel;

(e) the frequency domain range of the SL reference signal being less than a frequency domain range of the transport channel;

(f) the frequency domain range of the SL reference signal being equal to the frequency domain range of the transport channel;

(g) a subcarrier spacing of the SL reference signal being the same as a subcarrier spacing of the transport channel;

(h) the subcarrier spacing of the SL reference signal being an integer multiple of the subcarrier spacing of the transport channel;

(i) a beam of the SL reference signal being consistent with a beam associated with the transport channel;

(j) a start symbol of the SL reference signal being a symbol start position of the transport channel;

(k) the start symbol of the SL reference signal being a first predetermined symbol, where the first predetermined symbol has a fixed offset relative to the symbol start position of the transport channel;

(l) a symbol length of the SL reference signal being less than a symbol length of the transport channel;

(m) the symbol length of the SL reference signal being equal to the symbol length of the transport channel; and (n) priority information of the SL reference signal being determined based on priority information of the transport channel.

(4) Information of a target frequency domain start point.

The target frequency domain start point is at least one of the following: a target start point; and a frequency domain position obtained by performing fixed frequency domain shift relative to the target start point; where the target start point includes any one of a BWP start point, a resource pool frequency domain start point, or a transport channel start point.

(5) Information of a target frequency domain offset.

The target frequency domain offset is determined according to at least one of the following: frequency domain granularity; target frequency domain start point; or symbol information of the SL reference signal.

(6) Symbol information of the SL reference signal.

(7) Ninth specified information, where the ninth specified information includes at least one of a synchronization signal block SSB, a phase tracking reference signal, a demodulation reference signal, or a channel state information reference signal.

(8) Information about a target signal group corresponding to the SL reference signal.

(9) Information about a reference object included in the SL reference signal, where the reference object includes a reference signal or a reference signal resource set.

(10) A predetermined frequency range.

4. Time Domain Characteristic

The target time domain information corresponding to the SL reference signal includes at least one of transmission occasion, transmission time interval, or transmission quantity within a predetermined duration. In an implementation, the target time domain information may be determined based on at least one of the following (1) to (12):

(1) configuration information of a BWP;

(2) configuration information of a resource pool;

(3) configuration information of a transport channel;

(4) any one of SSB, phase tracking reference signal, demodulation reference signal, and channel state information reference signal;

(5) a specified signal within a predetermined monitoring window, where the specified signal includes at least one of reference signal received power, reference signal received quality, signal-to-noise ratio, received signal strength indicator, channel occupancy ratio, or channel busy ratio;

(6) information of a target time domain start point;

(7) information of a target time domain offset;

(8) symbol information of the SL reference signal;

(9) target pattern information included in the SL reference signal;

(10) information about a target signal group corresponding to the SL reference signal;

(11) information about a reference object included in the SL reference signal, where the reference object includes a reference signal or a reference signal resource set; or

(12) SL discontinuous reception configuration information.

In another implementation, the target time domain information is different from time domain position information of eleventh specified information, and the eleventh specified information includes at least one of second-stage SCI, DMRS, or PTRS.

5. Symbol Characteristic

Symbols included in the SL reference signal satisfy at least one of the following (1) to (9):

(1) a frequency domain offset between the symbols being the same;

(2) a time domain offset between the symbols being the same;

(3) a symbol sequence formed by the symbols being in a shape of ladder or comb;

(4) a time-domain relative offset of the symbols being determined according to a first predetermined rule;

(5) a frequency-domain start offset of the symbols being determined according to a second predetermined rule;

(6) a relative offset of the symbols being not greater than a comb size corresponding to the SL reference signal;

(7) a relative offset of the symbols being not greater than a total number of symbols corresponding to the SL reference signal;

(8) the number of symbols of the SL reference signal being corresponding to the reference object identification information, where the reference object includes a reference signal or a reference signal resource set; or (9) symbol information of a target symbol being corresponding to tenth specified information, where the symbol information of the target symbol includes the number of symbols in the SL reference signal, a symbol position, and a symbol offset of the target symbol, and the tenth specified information includes at least one of transport channel information, transmission resource information, resource pool information, or BWP that are corresponding to the SL reference signal.

6. Reference Object

Depending on the actual positioning requirements, the SL reference signal includes different information, for example, the SL reference signal may include information about at least one reference object, and the reference object includes a reference signal resource or a reference signal resource set.

The information about the reference object includes at least one of the following (1) to (5):

(1) reference object identification information;

(2) third specified information, where the third specified information includes at least one of resource allocation information, spatial direction information, power information, transmission occasion, transmitting user, or receiving user;

(3) geographic location information of a specified terminal, where the specified terminal includes the first terminal and/or the second terminal;

(4) specified synchronization information, where the specified synchronization information includes a synchronization reference signal and/or a synchronization resource; or (5) time stamp information, where the time stamp information includes at least one of absolute time, coordinated universal time, frame number, or relative time information.

In a possible implementation, the receiving an SL reference signal includes at least one of the following (1) to (4).

(1) Receiving the SL reference signal along with target SCI.

The target SCI includes first-stage SCI and/or second-stage SCI.

In this embodiment, at least one of the following (a) to (d) may be carried in the target SCI:

(a) configuration information of the SL reference signal;

(b) auxiliary information of the SL reference signal;

(c) measurement request information of the SL reference signal; or (d) measurement request information of the SL reference signal.

(2) Receiving the SL reference signal along with a target SSB.

In an implementation, at least one of the following (a) to (d) of the SL reference signal corresponds to the target SSB:

(a) target frequency domain information;

(b) target time domain information;

(c) signal sequence information; or (d) signal synchronization information.

(3) Receiving the SL reference signal along with a target transport channel.

In an implementation, at least one of the following (a) to (d) of the SL reference signal corresponds to the target transport channel:

(a) target frequency domain information;

(b) target time domain information;

(c) signal sequence information; or (d) signal synchronization information.

(4) Receiving the SL reference signal separately.

For example, the SL reference signal may be sent independently of SCI or other signals/channels.

Depending on different positioning scenarios, the SL reference signal includes reference signals corresponding to at least one target signal group, and the target signal group satisfies any one of the following:

(1) Different target signal groups correspond to different reference signal types.

The reference signal types are different in different signal type division manners.

For example, the reference signal type includes at least one of a first type SL reference signal, a second type SL reference signal, or a third type SL reference signal. The first type SL reference signal carries a broadcast identifier ID or/and a type ID; the second type SL reference signal carries a group ID; and the third type SL reference signal carries a terminal ID or/and a signal ID.

(2) Different target signal groups correspond to different target signal group identifiers.

(3) Different target signal groups correspond to different reference objects, where the reference object includes a reference signal or a reference signal set.

(4) Different target signal groups are mapped to different resource pools.

(5) Different target signal groups correspond to different positioning requirements.

It should be noted that for the implementation process in each implementation described in this embodiment, reference may be made to the related descriptions in the foregoing methods 200 to 1000, and to avoid repetition, details are not repeated herein in this embodiment.

It should be noted that, in the SL-based positioning method provided by the embodiments of this application, the execution body may be an SL-based positioning apparatus, or a control module for executing the SL-based positioning method in the SL-based positioning apparatus. In the embodiments of this application, the SL-based positioning method being performed by the SL-based positioning apparatus is used as an example to describe the SL-based positioning apparatus provided in the embodiments of this application.

Figure 11:
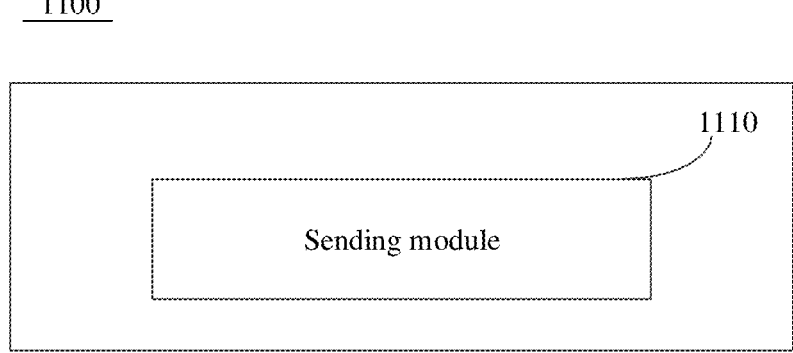
FIG. 11 is a schematic diagram of a block structure of an SL-based positioning apparatus according to an example embodiment of this application.

As shown in FIG. 11, FIG. 11 is a schematic diagram of a block structure of an SL-based positioning apparatus 1100 according to an example embodiment of this application. The apparatus 1100 includes a sending module 1110 configured to send an SL reference signal. The SL reference signal is used for at least one of the following: determining a location of a first terminal; determining a relative location between the first terminal and at least one second terminal; determining a location of at least one of second terminal; or determining a distance between the first terminal and at least one of second terminal.

In a possible implementation, the sending module 1110 is configured to send the SL reference signal according to at least one of the following: a first scheduling request, where the first scheduling request indicates a network-side device to schedule the SL reference signal; a second scheduling request, where the second scheduling request indicates a third terminal to schedule the SL reference signal; a pre-configured requirement; pre-configured resource configuration; or a predetermined indication.

In a possible implementation, the SL reference signal satisfies at least one of the following: a sending position of the SL reference signal exceeds a range of a first SL resource; a sending position of the SL reference signal is indicated by first sidelink control information SCI or first downlink control information DCI; the SL reference signal is a reference signal with a target pattern; a sending status of the SL reference signal is indicated by the first SCI or the first DCI; or a sending status of the SL reference signal is related to first specified information, where the first specified information includes at least one of priority information, resource pool information, channel busy ratio, channel occupancy ratio, quality of service parameter, terminal communication range, transmission type, or terminal type.

In a possible implementation, in a case of sending the SL reference signal according to the first scheduling request or the second scheduling request, the SL reference signal satisfies at least one of the following: a scheduling position of the SL reference signal exceeds the range of the first SL resource; the scheduling position of the SL reference signal is indicated by second SCI or second DCI; a target pattern corresponding to the SL reference signal is indicated by third SCI or third DCI; a scheduling status of the SL reference signal is indicated by fourth SCI or fourth DCI; or the scheduling status of the SL reference signal is related to second specified information, where the second specified information includes at least one of priority information, resource pool information, channel busy ratio, channel occupancy ratio, quality of service parameter, terminal communication range, transmission type, or terminal type.

In a possible implementation, the SL reference signal includes information about at least one reference object, and the reference object includes a reference signal resource or a reference signal resource set. The information about the reference object includes at least one of the following: reference object identification information; third specified information, where the third specified information includes at least one of resource allocation information, spatial direction information, power information, transmission occasion, transmitting user, or receiving user; geographic location information of a specified terminal, where the specified terminal includes the first terminal and/or the second terminal; specified synchronization information, where the specified synchronization information includes a synchronization reference signal and/or a synchronization resource; or time stamp information, where the time stamp information includes at least one of absolute time, coordinated universal time, frame number, or relative time information.

In a possible implementation, the SL reference signal includes reference signals corresponding to at least one target signal group, and the target signal group satisfies any one of the following: different target signal groups correspond to different reference signal types; different target signal groups correspond to different target signal group identifiers; different target signal groups correspond to different reference objects, where the reference object includes a reference signal or a reference signal set; different target signal groups are mapped to different resource pools; and different target signal groups correspond to different positioning requirements.

In a possible implementation, the reference signal type includes at least one of a first type SL reference signal, a second type SL reference signal, and a third type SL reference signal; where the first type SL reference signal carries a broadcast identifier ID or/and a type ID; the second type SL reference signal carries a group ID; or the third type SL reference signal carries a terminal ID or/and a signal ID.

In a possible implementation, a sequence characteristic of the SL reference signal carries at least one of the following: fourth specified information, where the fourth specified information includes at least one of user identification information, user group identification information, user time information, user time source information, signal scrambling information, or cyclic redundancy check CRC information; fifth specified information, where the fifth specified information includes at least one of a cyclic shift, a cyclic shift pair, or a cyclic shift group; sixth specified information, where the sixth specified information includes at least one of transport channel information, transmission resource information, resource pool information, or bandwidth part BWP information that are corresponding to the SL reference signal; seventh specified information, where the seventh specified information includes reference object identification information, and the reference object includes a reference signal or a reference signal set; specified resource information, where the specified resource information is resource information used for sending the SL reference signal; or geographic location information of a specified terminal, where the specified terminal includes the first terminal and/or the second terminal.

In a possible implementation, the SL reference signal includes at least one target pattern.

In a possible implementation, a target pattern characteristic corresponding to the target pattern has a correspondence with at least one of the following: density, code division multiplexing type, the number of ports, comb value, the number of symbols, RE offset, SL symbol type, symbol position, bandwidth, positioning requirement, sequence characteristic, transport channel, transmission resource, resource pool, or BWP that are corresponding to the SL reference signal.

In a possible implementation, the target pattern characteristic is determined with reference to a predetermined automatic gain control AGC manner.

In a possible implementation, the predetermined AGC manner includes at least one of the following: performing repetition on a specified symbol in the SL reference signal for K times, where $K>1$; controlling the number of symbols in the SL reference signal to be greater than 1; sending the SL reference signal after eighth specified information, where the eighth specified information includes at least one of second-stage SCI, a demodulation reference signal, or a phase tracking reference signal; or configuring a measurement gap.

In a possible implementation, target frequency domain information corresponding to the SL reference signal is determined according to at least one of the following: configuration information of a bandwidth part BWP; configuration information of a resource pool; information of a transport channel; information of a target frequency domain start point; information of a target frequency domain offset; symbol information of the SL reference signal; ninth specified information, where the ninth specified information includes at least one of a synchronization signal block SSB, a phase tracking reference signal, a demodulation reference signal, or a channel state information reference signal; information about a target signal group corresponding to the SL reference signal; information about a reference object included in the SL reference signal, where the reference object includes a reference signal or a reference signal resource set; or a predetermined frequency range; where the target frequency domain information includes at least one of subcarrier spacing, offset information of a start RE, or bandwidth.

In a possible implementation, the target frequency domain start point is at least one of the following: a target start point; and a frequency domain position obtained by performing fixed frequency domain shift relative to the target start point; where the target start point includes any one of a BWP start point, a resource pool frequency domain start point, or a transport channel start point.

In a possible implementation, the target frequency domain offset is determined according to at least one of the following: frequency domain granularity; target frequency domain start point; or symbol information of the SL reference signal.

In a possible implementation, that the target frequency domain information is determined based on the configuration information of the BWP includes any one of the following: configuration information of each BWP in the SL reference signal; a start point of the SL reference signal being equal to a start point of the BWP; a start point of the SL reference signal being equal to a start point of the BWP; a frequency domain range of the SL reference signal being located within the BWP; the frequency domain range of the SL reference signal being less than a frequency domain range of the BWP; the frequency domain range of the SL reference signal being equal to the frequency domain range of the BWP; a subcarrier spacing of the SL reference signal being the same as a subcarrier spacing of the BWP; the subcarrier spacing of the SL reference signal being an integer multiple of the subcarrier spacing of the BWP; a beam of the SL reference signal being consistent with a beam associated with the BWP; a start symbol of the SL reference signal being a symbol start position of the BWP; the start symbol of the SL reference signal being a first predetermined symbol, where the first predetermined symbol has a fixed offset relative to the symbol start position of the BWP; a symbol length of the SL reference signal being less than a symbol length of the BWP; the symbol length of the SL reference signal being equal to the symbol length of the BWP; and priority information of the SL reference signal being determined based on priority information of the BWP.

In a possible implementation, that the target frequency domain information is determined based on the configuration information of the resource pool includes any one of the following: a start point of the SL reference signal being equal to a start point of the resource pool; the start point of the SL reference signal being greater than the start point of the resource pool; a frequency domain range of the SL reference signal being located within a frequency domain range corresponding to the resource pool; the frequency domain range of the SL reference signal being less than the frequency domain range of the resource pool; the frequency domain range of the SL reference signal being equal to the frequency domain range of the resource pool; a subcarrier spacing of the SL reference signal being the same as a subcarrier spacing of the resource pool; the subcarrier spacing of the SL reference signal being an integer multiple of the subcarrier spacing of the resource pool; a beam of the SL reference signal being consistent with a beam associated with the resource pool; a start symbol of the SL reference signal being a symbol start position of the resource pool; the start symbol of the SL reference signal being a second predetermined symbol, where the second predetermined symbol has a fixed offset relative to the symbol start position of the resource pool; a symbol length of the SL reference signal being less than a symbol length of the resource pool; the symbol length of the SL reference signal being equal to the symbol length of the resource pool; and priority information of the SL reference signal being determined based on priority information of the resource pool.

In a possible implementation, that the target frequency domain information is determined according to the information of the transport channel includes any one of the following: a start point of the SL reference signal being equal to a start point of the transport channel; the start point of the SL reference signal being greater than the start point of the transport channel; a frequency domain range of the SL reference signal being located within a frequency domain range corresponding to the transport channel; the frequency domain range of the SL reference signal being less than the frequency domain range corresponding to the transport channel; the frequency domain range of the SL reference signal being equal to the frequency domain range corresponding to the transport channel; a subcarrier spacing of the SL reference signal being the same as a subcarrier spacing of the transport channel; the subcarrier spacing of the SL reference signal being an integer multiple of the subcarrier spacing of the transport channel; a beam of the SL reference signal being consistent with a beam associated with the transport channel; a start symbol of the SL reference signal being a symbol start position of the transport channel; the start symbol of the SL reference signal being a third predetermined symbol, where the third predetermined symbol has a fixed offset relative to the symbol start position of the transport channel, and a symbol length of the SL reference signal is less than a symbol length of the transport channel; the symbol length of the SL reference signal being equal to the symbol length of the transport channel; and priority information of the SL reference signal being determined based on priority information of the transport channel.

In a possible implementation, target time domain information corresponding to the SL reference signal is determined according to at least one of the following: configuration information of a BWP; configuration information of a resource pool; configuration information of a transport channel; any one of SSB, phase tracking reference signal, demodulation reference signal, and channel state information reference signal; a specified signal within a predetermined monitoring window, where the specified signal includes at least one of reference signal received power, reference signal received quality, signal-to-noise ratio, received signal strength indicator, channel occupancy ratio, or channel busy ratio; information of a target time domain start point; information of a target time domain offset; symbol information of the SL reference signal; target pattern information included in the SL reference signal; information about a target signal group corresponding to the SL reference signal; information about a reference object included in the SL reference signal, where the reference object includes a reference signal or a reference signal resource set; or SL discontinuous reception configuration information; where the target time domain information includes at least one of transmission occasion, transmission time interval, or transmission quantity within a predetermined duration.

In a possible implementation, the target time domain information is different from time domain position information of eleventh specified information, and the eleventh specified information includes at least one of second-stage SCI, DMRS, or PTRS.

In a possible implementation, at least one of the following in the SL reference signal corresponds to a target SSB or a target transport channel: target frequency domain information; target time domain information; signal sequence information; or signal synchronization information.

In a possible implementation, symbols included in the SL reference signal satisfy at least one of the following: a time domain offset between the symbols being the same; a symbol sequence formed by the symbols being in a shape of ladder or comb; a time-domain relative offset of the symbols being determined according to a first predetermined rule; a frequency-domain start offset of the symbols being determined according to a second predetermined rule; a relative offset of the symbols being not greater than a comb size corresponding to the SL reference signal; a relative offset of the symbols being not greater than a total number of symbols corresponding to the SL reference signal; the number of symbols of the SL reference signal being corresponding to the reference object identification information, where the reference object includes a reference signal or a reference signal resource set; or symbol information of a target symbol being corresponding to tenth specified information, where the symbol information of the target symbol includes the number of symbols in the SL reference signal and a symbol offset of the target symbol, and the tenth specified information includes at least one of transport channel information, transmission resource information, resource pool information, or BWP that are corresponding to the SL reference signal.

In a possible implementation, the sending module 1110 is further configured to perform at least one of the following: sending the SL reference signal along with target SCI; sending the SL reference signal along with a target SSB; sending the SL reference signal along with a target transport channel; or sending the SL reference signal separately.

In a possible implementation, the target SCI includes first-stage SCI and/or second-stage SCI.

In a possible implementation, the target SCI carries at least one of the following: configuration information of the SL reference signal; auxiliary information of the SL reference signal; measurement request information of the SL reference signal; or measurement request information of the SL reference signal.

Figure 12:
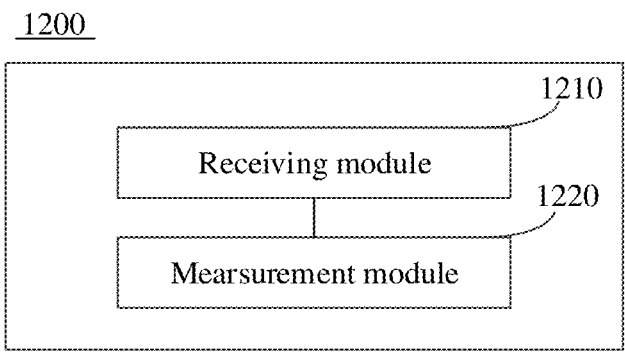
FIG. 12 is a schematic diagram of a block structure of an SL-based positioning apparatus according to another example embodiment of this application.

As shown in FIG. 12, FIG. 12 is a schematic diagram of a block structure of an SL-based positioning apparatus 1200 according to an example embodiment of this application. The apparatus 1200 includes: a receiving module 1210, configured to receive an SL reference signal sent by a first terminal; and a measurement module 1220, configured to perform at least one of the following based on the SL reference signal: determining a location of the first terminal; determining a relative location between the first terminal and a second terminal; determining a location of the second terminal; or determining a distance between the first terminal and the second terminal.

In a possible implementation, the receiving module is configured to receive the SL reference signal according to at least one of the following: a third scheduling request, where the third scheduling request indicates a network-side device to schedule to receive the SL reference signal; a fourth scheduling request, where the fourth scheduling request indicates a third terminal to schedule to receive the SL reference signal; a pre-configured requirement; pre-configured resource configuration; or a predetermined indication.

In a possible implementation, the SL reference signal satisfies at least one of the following: a position for receiving the SL reference signal is independent; a position for receiving the SL reference signal is indicated by fifth sidelink control information SCI or fifth downlink control information DCI; the SL reference signal is a reference signal with a target pattern; a receiving status of the SL reference signal is indicated by sixth SCI or sixth DCI; or a receiving status of the SL reference signal is associated with first specified information, where the first specified information includes at least one of priority information, resource pool information, channel busy ratio, channel occupancy ratio, quality of service QoS parameter, terminal communication range, transmission type, or terminal type.

In a possible implementation, in a case of receiving the SL reference signal according to the third scheduling request or the fourth scheduling request, the SL reference signal satisfies at least one of the following: a scheduling position of the SL reference signal exceeds the range of the first SL resource; the scheduling position of the SL reference signal is indicated by second SCI or second DCI; a target pattern corresponding to the SL reference signal is indicated by third SCI or third DCI; a scheduling status of the SL reference signal is indicated by fourth SCI or fourth DCI; or the scheduling status of the SL reference signal is related to second specified information, where the second specified information includes at least one of priority information, resource pool information, channel busy ratio, channel occupancy ratio, quality of service QoS parameter, terminal communication range, transmission type, or terminal type.

In a possible implementation, the SL reference signal includes information about at least one reference object, and the reference object includes a reference signal resource or a reference signal resource set. The information about the reference object includes at least one of the following: reference object identification information; third specified information, where the third specified information includes at least one of resource allocation information, spatial direction information, power information, transmission occasion, transmitting user, or receiving user; geographic location information of a specified terminal, where the specified terminal includes the first terminal and/or the second terminal; specified synchronization information, where the specified synchronization information includes a synchronization reference signal and/or a synchronization resource; or time stamp information, where the time stamp information includes at least one of absolute time, coordinated universal time, frame number, or relative time information.

In a possible implementation, the SL reference signal includes reference signals corresponding to at least one target signal group, and the target signal group satisfies any one of the following: different target signal groups correspond to different reference signal types; different target signal groups correspond to different target signal group identifiers; different target signal groups correspond to different reference objects, where the reference object includes a reference signal or a reference signal set; different target signal groups are mapped to different resource pools; and different target signal groups correspond to different positioning requirements.

In a possible implementation, the reference signal type includes at least one of a first type SL reference signal, a second type SL reference signal, or a third type SL reference signal; where the first type SL reference signal carries a broadcast identifier ID or/and a type ID; the second type SL reference signal carries a group ID; and the third type SL reference signal carries a terminal ID or/and a signal ID.

In a possible implementation, a sequence characteristic of the SL reference signal carries at least one of the following: fourth specified information, where the fourth specified information includes at least one of user identification information, user group identification information, user time information, user time source information, signal scrambling information, or cyclic redundancy check CRC information; fifth specified information, where the fifth specified information includes at least one of a cyclic shift, a cyclic shift pair, or a cyclic shift group; sixth specified information, where the sixth specified information includes at least one of transport channel information, transmission resource information, resource pool information, or bandwidth part BWP information that are corresponding to the SL reference signal; seventh specified information, where the seventh specified information includes reference object identification information, and the reference object includes a reference signal or a reference signal set; specified resource information, where the specified resource information is resource information used for sending the SL reference signal; or geographic location information of a specified terminal, where the specified terminal includes the first terminal and/or the second terminal.

In a possible implementation, the SL reference signal includes at least one target pattern.

In a possible implementation, a target pattern characteristic corresponding to the target pattern has a correspondence with at least one of the following: density, code division multiplexing type, the number of ports, comb value, the number of symbols, RE offset, SL symbol type, symbol position, bandwidth, positioning requirement, sequence characteristic, transport channel, transmission resource, resource pool, or BWP that are corresponding to the SL reference signal.

In a possible implementation, the target pattern characteristic is determined with reference to a predetermined automatic gain control AGC manner.

In a possible implementation, the predetermined AGC manner includes at least one of the following: performing repetition on a specified symbol in the SL reference signal for K times, where K>1; controlling the number of symbols in the SL reference signal to be greater than 1; sending the SL reference signal after eighth specified information, where the eighth specified information includes at least one of second-stage SCI, a demodulation reference signal, or a phase tracking reference signal; or configuring a measurement gap.

In a possible implementation, target frequency domain information corresponding to the SL reference signal is determined according to at least one of the following: configuration information of a bandwidth part BWP; configuration information of a resource pool; information of a transport channel; information of a target frequency domain start point; information of a target frequency domain offset; symbol information of the SL reference signal; ninth specified information, where the ninth specified information includes at least one of a synchronization signal block SSB, a phase tracking reference signal, a demodulation reference signal, or a channel state information reference signal; information about a target signal group corresponding to the SL reference signal; information about a reference object included in the SL reference signal, where the reference object includes a reference signal or a reference signal resource set; or a predetermined frequency range; where the target frequency domain information includes at least one of subcarrier spacing, offset information of a start RE, or bandwidth.

In a possible implementation, the target frequency domain start point is at least one of the following: a target start point; and a frequency domain position obtained by performing fixed frequency domain shift relative to the target start point; where the target start point includes any one of a BWP start point, a resource pool frequency domain start point, or a transport channel start point.

In a possible implementation, the target frequency domain offset is determined according to at least one of the following: frequency domain granularity; target frequency domain start point; or symbol information of the SL reference signal.

In a possible implementation, that the target frequency domain information is determined based on the configuration information of the BWP includes any one of the following: configuration information of each BWP in the SL reference signal; a start point of the SL reference signal being equal to a start point of the BWP; a start point of the SL reference signal being equal to a start point of the BWP; a frequency domain range of the SL reference signal being located within the BWP; the frequency domain range of the SL reference signal being less than a frequency domain range of the BWP; the frequency domain range of the SL reference signal being equal to the frequency domain range of the BWP; a subcarrier spacing of the SL reference signal being the same as a subcarrier spacing of the BWP; the subcarrier spacing of the SL reference signal being an integer multiple of the subcarrier spacing of the BWP; a beam of the SL reference signal being consistent with a beam associated with the BWP; a start symbol of the SL reference signal being a symbol start position of the BWP; the start symbol of the SL reference signal being a first predetermined symbol, where the first predetermined symbol has a fixed offset relative to the symbol start position of the BWP; a symbol length of the SL reference signal being less than a symbol length of the BWP; the symbol length of the SL reference signal being equal to the symbol length of the BWP; and priority information of the SL reference signal being determined based on priority information of the BWP.

In a possible implementation, that the target frequency domain information is determined based on the configuration information of the resource pool includes any one of the following: a start point of the SL reference signal being equal to a start point of the resource pool; the start point of the SL reference signal being greater than the start point of the resource pool; a frequency domain range of the SL reference signal being located within a frequency domain range corresponding to the resource pool; the frequency domain range of the SL reference signal being less than the frequency domain range of the resource pool; the frequency domain range of the SL reference signal being equal to the frequency domain range of the resource pool; a subcarrier spacing of the SL reference signal being the same as a subcarrier spacing of the resource pool; the subcarrier spacing of the SL reference signal being an integer multiple of the subcarrier spacing of the resource pool; a beam of the SL reference signal being consistent with a beam associated with the resource pool; a start symbol of the SL reference signal being a symbol start position of the resource pool; the start symbol of the SL reference signal being a second predetermined symbol, where the second predetermined symbol has a fixed offset relative to the symbol start position of the resource pool; a symbol length of the SL reference signal being less than a symbol length of the resource pool; the symbol length of the SL reference signal being equal to the symbol length of the resource pool; and priority information of the SL reference signal being determined based on priority information of the resource pool.

In a possible implementation, that the target frequency domain information is determined according to the information of the transport channel includes any one of the following: a start point of the SL reference signal being equal to a start point of the transport channel; the start point of the SL reference signal being greater than the start point of the transport channel; a frequency domain range of the SL reference signal being located within a frequency domain range corresponding to the transport channel; the frequency domain range of the SL reference signal being less than the frequency domain range corresponding to the transport channel; the frequency domain range of the SL reference signal being equal to the frequency domain range corresponding to the transport channel; a subcarrier spacing of the SL reference signal being the same as a subcarrier spacing of the transport channel; the subcarrier spacing of the SL reference signal being an integer multiple of the subcarrier spacing of the transport channel; a beam of the SL reference signal being consistent with a beam associated with the transport channel; a start symbol of the SL reference signal being a symbol start position of the transport channel; the start symbol of the SL reference signal being a third predetermined symbol, where the third predetermined symbol has a fixed offset relative to the symbol start position of the transport channel, and a symbol length of the SL reference signal is less than a symbol length of the transport channel; the symbol length of the SL reference signal being equal to the symbol length of the transport channel; and priority information of the SL reference signal being determined based on priority information of the transport channel.

In a possible implementation, target time domain information corresponding to the SL reference signal is determined according to at least one of the following: configuration information of a BWP; configuration information of a resource pool; configuration information of a transport channel; any one of SSB, phase tracking reference signal, demodulation reference signal, and channel state information reference signal; a specified signal within a predetermined monitoring window, where the specified signal includes at least one of reference signal received power, reference signal received quality, signal-to-noise ratio, received signal strength indicator, channel occupancy ratio, or channel busy ratio; information of a target time domain start point; information of a target time domain offset; symbol information of the SL reference signal; target pattern information included in the SL reference signal; information about a target signal group corresponding to the SL reference signal; information about a reference object included in the SL reference signal, where the reference object includes a reference signal or a reference signal resource set; or SL discontinuous reception configuration information; where the target time domain information includes at least one of transmission occasion, transmission time interval, or transmission quantity within a predetermined duration.

In a possible implementation, the target time domain information is different from time domain position information of eleventh specified information, and the eleventh specified information includes at least one of second-stage SCI, DMRS, or PTRS.

In a possible implementation, at least one of the following in the SL reference signal corresponds to a target SSB or a target transport channel: target frequency domain information; target time domain information; signal sequence information; or signal synchronization information.

In a possible implementation, symbols included in the SL reference signal satisfy at least one of the following: a time domain offset between the symbols being the same; a symbol sequence formed by the symbols being in a shape of ladder or comb; a time-domain relative offset of the symbols being determined according to a first predetermined rule; a frequency-domain start offset of the symbols being determined according to a second predetermined rule; a relative offset of the symbols being not greater than a comb size corresponding to the SL reference signal; a relative offset of the symbols being not greater than a total number of symbols corresponding to the SL reference signal; the number of symbols of the SL reference signal being corresponding to the reference object identification information, where the reference object includes a reference signal or a reference signal resource set; or symbol information of a target symbol being corresponding to tenth specified information, where the symbol information of the target symbol includes the number of symbols in the SL reference signal and a symbol offset of the target symbol, and the tenth specified information includes at least one of transport channel information, transmission resource information, resource pool information, or BWP that are corresponding to the SL reference signal.

In a possible implementation, the receiving an SL reference signal includes at least one of the following: receiving the SL reference signal along with target SCI; receiving the SL reference signal along with target SSB; receiving the SL reference signal along with a target transport channel; or receiving the SL reference signal separately.

In a possible implementation, the target SCI includes first-stage SCI and/or second-stage SCI.

In a possible implementation, the target SCI carries at least one of the following: configuration information of the SL reference signal; auxiliary information of the SL reference signal; measurement request information of the SL reference signal; or measurement request information of the SL reference signal.

The SL-based positioning apparatus in this embodiment of this application may be an apparatus, or may be a component, an integrated circuit, or a chip in a terminal. The apparatus may be a mobile terminal or a non-mobile terminal. For example, the mobile terminal may include but is not limited to the types of the terminal 11 listed above, and the non-mobile terminal may be a server, a network attached storage (NAS), a personal computer (PC), a television (TV), a teller machine, a self-service machine, or the like, which is not specifically limited in this embodiment of this application.

The SL-based positioning apparatus in this embodiment of this application may be an apparatus with an operating system. The operating system may be an Android operating system, an iOS operating system, or other possible operating systems, and is not specifically limited in the embodiments of this application.

The SL-based positioning apparatus provided in this embodiment of this application is capable of implementing the processes implemented in the method embodiments in FIG. 2 to FIG. 10, with the same technical effects achieved. To avoid repetition, details are not described herein again.

Figure 13:
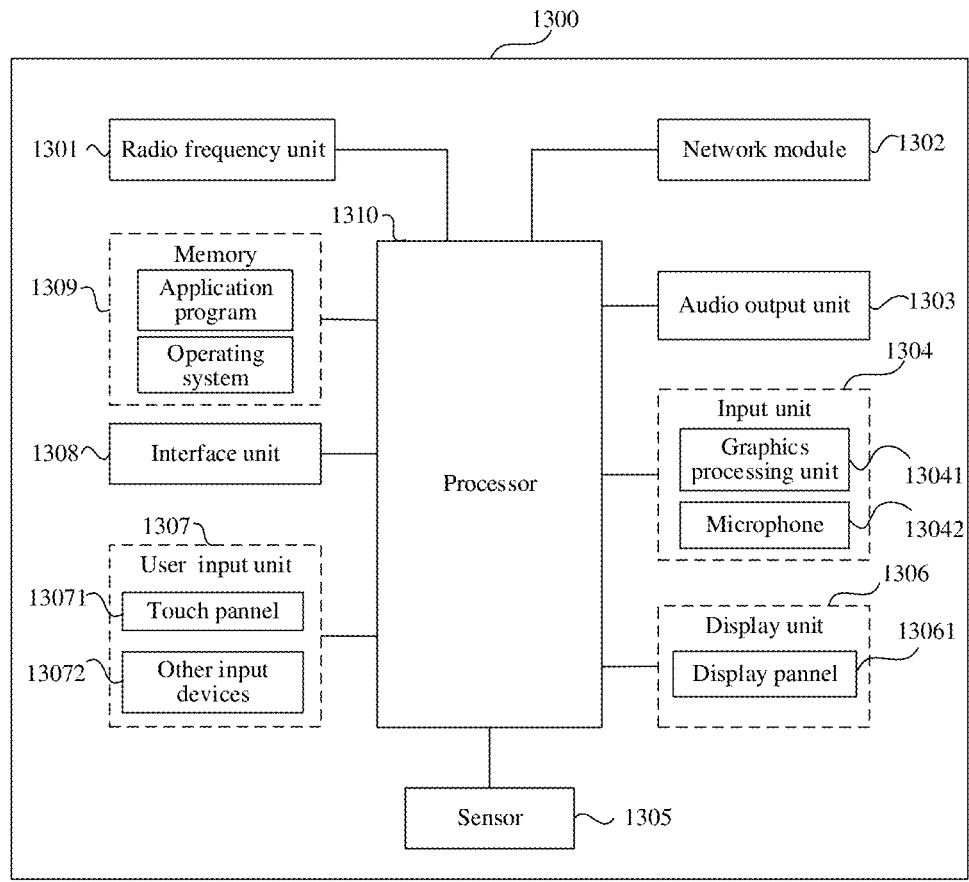
FIG. 13 is a schematic diagram of a block structure of a terminal according to an example embodiment of this application.

As shown in FIG. 13, FIG. 13 is a schematic diagram of a hardware structure of a terminal for implementing the embodiments of this application.

The terminal 1300 includes but is not limited to components such as a radio frequency unit 1301, a network module 1302, an audio output unit 1303, an input unit 1304, a sensor 1305, a display unit 1306, a user input unit 1307, an interface unit 1308, a memory 1309, and a processor 1310.

Persons skilled in the art can understand that the terminal 1300 may further include a power supply (for example, a battery) supplying power to the components, and the power supply may be logically connected to the processor 1310 through a power management system. In this way, functions such as charge management, discharge management, and power consumption management are implemented by using the power management system. The structure of the terminal shown in FIG. 13 does not constitute any limitation on the terminal. The terminal may include more or fewer components than those shown in the figure, or a combination of some components, or the components disposed differently. Details are not described herein again.

It can be understood that in this embodiment of this application, the input unit 1304 may include a graphics processing unit (GPU) 13041 and a microphone 13042. The graphics processing unit 13041 processes image data of a still picture or video obtained by an image capture apparatus (such as a camera) in a video capture mode or an image capture mode. The display unit 1306 may include a display panel 13061, and the display panel 13061 may be configured in a form of a liquid crystal display, an organic light-emitting diode, and the like. The user input unit 1307 may include a touch panel 13071 and other input devices 13072. The touch panel 13071 is also referred to as a touchscreen. The touch panel 13071 may include two parts: a touch detection apparatus and a touch controller. The other input devices 13072 may include but are not limited to a physical keyboard, a function key (such as a volume control key or a power on/off key), a trackball, a mouse, a joystick, and the like. Details are not described herein.

In this embodiment of this application, the radio frequency unit 1301 receives downlink data from a network-side device, and then sends the downlink data to the processor 1310 for processing; and also sends uplink data to the network-side device. Generally, the radio frequency unit 1301 includes but is not limited to an antenna, at least one amplifier, a transceiver, a coupler, a low noise amplifier, a duplexer, and the like.

The memory 1309 may be configured to store software programs or instructions and various data. The memory 1309 may include a program or instruction storage area and a data storage area. The program or instruction storage area may store an operating system, an application program or instruction required by at least one function (for example, a sound playback function or an image playback function), and the like. In addition, the memory 1309 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage device, a flash memory device, or another volatile solid-state storage device.

The processor 1310 may include one or more processing units. Optionally, an application processor and a modem processor may be integrated in the processor 1310. The application processor primarily processes an operating system, user interfaces, application programs or instructions, and the like. The modem processor primarily processes radio communication, for example, being a baseband processor. It can be understood that the modem processor may alternatively be not integrated in the processor 1310.

The processor 1310 invokes the instructions or program in the memory 1309 to perform the method performed by the modules shown in FIG. 11 or FIG. 12, with the same technical effects achieved. To avoid repetition, details are not repeated herein.

An embodiment of this application further provides a non-transitory readable storage medium, where a program or instructions are stored in the non-transitory readable storage medium. When the program or the instructions are executed by a processor, the processes of the foregoing embodiment of the SL-based positioning method described above can be implemented, with the same technical effects achieved. To avoid repetition, details are not described herein again.

The processor is a processor in the terminal described in the foregoing embodiments. The non-transitory readable storage medium includes a non-transitory computer-readable storage medium, for example, a computer read-only memory (ROM), a random access memory (RAM), a magnetic disk, or an optical disc.

An embodiment of this application further provides a chip, where the chip includes a processor and a communications interface. The communications interface is coupled to the processor, and the processor is configured to run a program or instructions of a network side device to implement the processes of the foregoing SL-based positioning method embodiments, with the same technical effects achieved. To avoid repetition, details are not described herein again.

It should be understood that the chip mentioned in the embodiments of this application may also be referred to as a system-level chip, a system chip, a chip system, a system-on-chip, or the like.

An embodiment of this application further provides a computer program product, where the computer program product includes a processor, a memory, and a program or instructions stored in the memory and executable on the processor, and when the program or the instructions are executed by the processor, the processes of the foregoing embodiments of the SL-based positioning method are implemented, with the same technical effects achieved. To avoid repetition, details are not described herein again.

It should be noted that in this specification, the term "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element. In addition, it should be noted that the scope of the method and the apparatus in the embodiments of this application is not limited to executing the functions in an order shown or discussed, but may also include executing the functions in a substantially simultaneous manner or in a reverse order, depending on the functions involved. For example, the described methods may be performed in an order different from that described, and steps may alternatively be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of the present invention essentially or the part contributing to the prior art may be implemented in a form of a software product. The software product is stored in a storage medium (such as a ROM/RAM, a magnetic disk, or an optical disc), and includes several instructions for indicating a terminal (which may be a mobile phone, a computer, a server, an air conditioner, a network device, or the like) to perform the methods described in the embodiments of this disclosure.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A sidelink (SL)-based positioning method, wherein the method comprises:
   sending, by a first terminal, an SL reference signal;
      wherein the SL reference signal is received by at least one second terminal, and the SL reference signal is used for at least one of:
      determining a location of the first terminal;
      determining a relative location between the first terminal and the at least one second terminal;
      determining a location of the at least one second terminal; or determining a distance between the first terminal and the at least one second terminal;

wherein the SL reference signal comprises at least one pattern, and a pattern characteristic corresponding to the pattern has a correspondence with at least one of:

comb value, the number of symbols, or resource element offset of the SL reference signal;

wherein frequency domain information of the SL reference signal comprises at least one of:

the frequency domain information of the SL reference signal is determined based on configuration information of a resource pool, wherein a frequency domain range of the SL reference signal is the same as a frequency domain range of the resource pool; or the frequency domain information of the SL reference signal is determined based on information of a transport channel, wherein the frequency domain range of the SL reference signal is the same as a frequency domain range of the transport channel.

2. The method according to claim 1, wherein the sending an SL reference signal comprises:

sending the SL reference signal according to at least one of:

a first scheduling request, wherein the first scheduling request indicates a network-side device to schedule the SL reference signal;

a second scheduling request, wherein the second scheduling request indicates a third terminal to schedule the SL reference signal;

a pre-configured requirement;

pre-configured resource configuration; or a predetermined indication.

3. The method according to claim 1, wherein the SL reference signal satisfies at least one of:

a sending position of the SL reference signal exceeds a range of a first SL resource;

a sending position of the SL reference signal is indicated by first sidelink control information (SCI) or first downlink control information (DCI);

the SL reference signal is a reference signal with a target pattern;

a sending status of the SL reference signal is indicated by the first SCI or the first DCI; or a sending status of the SL reference signal is related to first specified information, wherein the first specified information comprises at least one of priority information, resource pool information, channel busy ratio, channel occupancy ratio, quality of service parameter, terminal communication range, transmission type, or terminal type.

4. The method according to claim 2, wherein, in a case of sending the SL reference signal according to the first scheduling request or the second scheduling request, the SL reference signal satisfies at least one of:

a scheduling position of the SL reference signal is indicated by second sidelink control information (SCI) or second downlink control information (DCI);

a target pattern corresponding to the SL reference signal is indicated by third SCI or third DCI;

a scheduling status of the SL reference signal is indicated by fourth SCI or fourth DCI; or the scheduling status of the SL reference signal is related to second specified information, wherein the second specified information comprises at least one of priority information, resource pool information, channel busy ratio, channel occupancy ratio, quality of service parameter, terminal communication range, transmission type, or terminal type.

5. The method according to claim 1, wherein the SL reference signal comprises information about at least one reference object, and the at least one reference object comprises a reference signal resource or a reference signal resource set; wherein the information about the at least one reference object comprises at least one of:

reference object identification information;

specified synchronization information, wherein the specified synchronization information comprises at least one of a synchronization reference signal or a synchronization resource; or time stamp information, wherein the time stamp information comprises at least one of absolute time, coordinated universal time, frame number, or relative time information.

6. The method according to claim 1, wherein the SL reference signal comprises reference signals corresponding to at least one target signal group, and the target signal group satisfies any one of following:

different target signal groups are mapped to different resource pools; and different target signal groups correspond to different positioning requirements.

7. The method according to claim 1, wherein a sequence characteristic of the SL reference signal carries:

fourth specified information, wherein the fourth specified information comprises at least one of user identification information, or cyclic redundancy check information.

8. The method according to claim 1, wherein the pattern characteristic corresponding to the pattern further has a correspondence with at least one of:

density, symbol position, or resource pool that are corresponding to the SL reference signal.

9. The method according to claim 1, wherein the frequency domain information comprises at least one of subcarrier spacing, offset information of a start resource element, or bandwidth.

10. The method according to claim 1, wherein target time domain information corresponding to the SL reference signal is determined according to at least one of:

the configuration information of the resource pool;

configuration information of the transport channel;

demodulation reference signal;

symbol information of the SL reference signal;

target pattern information comprised in the SL reference signal;

information about a target signal group corresponding to the SL reference signal;

wherein the target time domain information comprises at least one of transmission occasion, transmission time interval, or transmission quantity within a predetermined duration.

11. The method according to claim 10, wherein the target time domain information is different from time domain position information of eleventh specified information, and the eleventh specified information comprises at least one of second-stage sidelink control information (SCI), demodulation reference signal (DMRS), or phase tracking reference signal (PTRS).

12. The method according to claim 1, wherein at least one of following in the SL reference signal corresponds to a target synchronization signal block (SSB) or a target transport channel:

target frequency domain information;

target time domain information;

signal sequence information; or signal synchronization information.

13. The method according to claim 1, wherein symbols comprised in the SL reference signal satisfy at least one of:

a symbol sequence formed by the symbols being in a shape of ladder or comb;

a time-domain relative offset of the symbols being determined according to a first predetermined rule;

a frequency-domain start offset of the symbols being determined according to a second predetermined rule;

a relative offset of the symbols being not greater than a comb size corresponding to the SL reference signal;

a relative offset of the symbols being not greater than a total number of symbols corresponding to the SL reference signal;

the number of symbols of the SL reference signal corresponding to reference object identification information, wherein a reference object comprises a reference signal or a reference signal resource set; or symbol information of a target symbol being corresponding to tenth specified information, wherein the symbol information of the target symbol comprises the number of symbols in the SL reference signal and a symbol offset of the target symbol, and the tenth specified information comprises at least one of transport channel information, transmission resource information, resource pool information, or bandwidth part (BWP) that are corresponding to the SL reference signal.

14. The method according to claim 1, wherein the sending an SL reference signal comprises at least one of:

sending the SL reference signal along with target sidelink control information (SCI); or sending the SL reference signal along with a target transport channel.

15. The method according to claim 14, wherein the target SCI comprises at least one of first-stage SCI or second-stage SCI.

16. The method according to claim 15, wherein the target SCI carries at least one of:

configuration information of the SL reference signal;

auxiliary information of the SL reference signal; or measurement request information of the SL reference signal.

17. A terminal, comprising a processor, a memory, and a program or instructions stored in the memory and executable on the processor, wherein the terminal is a first terminal, and the program or the instructions, when executed by the processor, causes the first terminal to perform:

sending a sidelink (SL) reference signal; wherein the SL reference signal is received by at least one second terminal, and the SL reference signal is used for at least one of:

determining a location of the first terminal;

determining a relative location between the first terminal and the at least one second terminal;

determining a location of the at least one second terminal; or determining a distance between the first terminal and the at least one second terminal;

wherein the SL reference signal comprises at least one pattern, and a pattern characteristic corresponding to the pattern has a correspondence with at least one of: comb value, the number of symbols, or resource element offset of the SL reference signal;

wherein frequency domain information of the SL reference signal comprises at least one of:

the frequency domain information of the SL reference signal is determined based on configuration information of a resource pool, wherein a frequency domain range of the SL reference signal is the same as a frequency domain range of the resource pool; or the frequency domain information of the SL reference signal is determined based on information of a transport channel, wherein the frequency domain range of the SL reference signal is the same as a frequency domain range of the transport channel.

18. A terminal, comprising a processor, a memory, and a program or instructions stored in the memory and executable on the processor, wherein the terminal is a second terminal, and the program or the instructions, when executed by the processor, causes the second terminal to perform:

receiving a sidelink (SL) reference signal sent by a first terminal; and performing at least one of following based on the SL reference signal:

determining a location of the first terminal;

determining a relative location between the first terminal and the second terminal;

determining a location of the second terminal; or determining a distance between the first terminal and the second terminal;

wherein the SL reference signal comprises at least one pattern, and a pattern characteristic corresponding to the pattern has a correspondence with at least one of: comb value, the number of symbols, or resource element offset of the SL reference signal;

wherein frequency domain information of the SL reference signal comprises at least one of:

the frequency domain information of the SL reference signal is determined based on configuration information of a resource pool, wherein a frequency domain range of the SL reference signal is the same as a frequency domain range of the resource pool; or the frequency domain information of the SL reference signal is determined based on information of a transport channel, wherein the frequency domain range of the SL reference signal is the same as a frequency domain range of the transport channel.

* * * * *